(12) United States Patent
Meuth et al.

(10) Patent No.: US 12,313,325 B2
(45) Date of Patent: May 27, 2025

(54) MULTITEMPERATURE STORAGE SYSTEM

(71) Applicant: Ocado Innovation Limited, Hatfield (GB)

(72) Inventors: Benjamin Meuth, Hatfield (GB); Brian Reid, Hatfield (GB); Eric Boateng, Hatfield (GB); Fliss Chaplin, Hatfield (GB); Gavin Evans, Hatfield (GB); Ovi Cristescu, Hatfield (GB); Ribka Tahir, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 236 days.

(21) Appl. No.: 17/996,112

(22) PCT Filed: Apr. 19, 2021

(86) PCT No.: PCT/EP2021/060126
§ 371 (c)(1),
(2) Date: Oct. 13, 2022

(87) PCT Pub. No.: WO2021/209648
PCT Pub. Date: Oct. 21, 2021

(65) Prior Publication Data
US 2023/0194140 A1 Jun. 22, 2023

(30) Foreign Application Priority Data
Apr. 17, 2020 (GB) ..................................... 2005636

(51) Int. Cl.
*F25D 17/02* (2006.01)
*B65G 1/137* (2006.01)
(Continued)

(52) U.S. Cl.
CPC ............. *F25D 17/02* (2013.01); *B65G 1/137* (2013.01); *F25D 13/04* (2013.01); *F25D 17/005* (2013.01);
(Continued)

(58) Field of Classification Search
CPC .......... F25D 17/02; F25D 25/04; F25D 13/04; B65G 1/0464
See application file for complete search history.

(56) References Cited

U.S. PATENT DOCUMENTS

| 10,919,699 B2 | 2/2021 | Clarke et al. |
| 11,554,914 B2 | 1/2023 | Clarke et al. |

(Continued)

FOREIGN PATENT DOCUMENTS

| JP | S4910155 U | 1/1974 |
| JP | 2001021247 A | 1/2001 |

(Continued)

OTHER PUBLICATIONS

Office Action (Examination Report No. 2) issued on Mar. 7, 2024, by the Australian Patent Office in corresponding Australian Patent Application No. 2021255118. (5 pages).

(Continued)

*Primary Examiner* — Elizabeth J Martin
(74) *Attorney, Agent, or Firm* — Buchanan Ingersoll & Rooney PC

(57) ABSTRACT

A multitemperature storage system includes a storage structure including a plurality of upright members, a plurality of horizontal members supported by the upright members and forming a grid pattern defining a plurality of grid cells and allowing containers to be arranged in stacks beneath the grid cells defined by the grid pattern, and a track structure on top of the horizontal members, the track structure being configured to allow a load-handling device to move across the (Continued)

storage structure to retrieve a container from a stack; and including temperature-control to maintain a first-temperature region within the storage structure at a first temperature and a second-temperature region within the storage structure at a second temperature.

19 Claims, 14 Drawing Sheets

(51) Int. Cl.
 F25D 13/04 (2006.01)
 F25D 17/00 (2006.01)
 F25D 25/00 (2006.01)
 F25D 25/04 (2006.01)
 F25D 29/00 (2006.01)

(52) U.S. Cl.
 CPC .......... *F25D 25/005* (2013.01); *F25D 25/04* (2013.01); *F25D 29/00* (2013.01); *F25D 2700/12* (2013.01)

(56) References Cited

U.S. PATENT DOCUMENTS

| | | | |
|---|---|---|---|
| 2018/0128532 A1* | 5/2018 | Hognaland | F25D 25/04 |
| 2018/0170650 A1* | 6/2018 | Lindbo | F25D 13/02 |
| 2019/0246571 A1 | 8/2019 | Ingram-Tedd et al. | |
| 2019/0263589 A1* | 8/2019 | Clarke | B65G 1/0464 |
| 2021/0171284 A1 | 6/2021 | Clarke et al. | |
| 2023/0108952 A1 | 4/2023 | Clarke et al. | |

FOREIGN PATENT DOCUMENTS

| | | |
|---|---|---|
| JP | 2017512166 A | 5/2017 |
| JP | 2019532885 A | 11/2019 |
| WO | 2015124610 A1 | 8/2015 |
| WO | 2018050816 A1 | 3/2018 |
| WO | 2018060504 A1 | 4/2018 |
| WO | 2018073392 A1 | 4/2018 |
| WO | 2019001816 A1 | 1/2019 |

OTHER PUBLICATIONS

First Office Action issued on Nov. 14, 2023, by the Japanese Patent Office in corresponding Japanese Patent Application No. 2022-563052, and an English Translation of the Office Action. (9 pages).
Examination Report and Notification of Intention to Grant under Section 18(4) in corresponding Application No. GB 2105584.3 dated Apr. 11, 2022.
GB Search Report in corresponding Application No. GB2005636.2 dated Dec. 8, 2020.
GB Search Report in corresponding Application No. GB2105584.3 dated Oct. 15, 2021.
International Search Report (PCT/ISA/210) and Written Opinion (PCT/ISA/237) mailed on Jul. 2, 2021, by the European Patent Office as the International Searching Authority for International Application No. PCT/EP2021/060126.
Patents Act 1977: Search Report under Section 17(5) in corresponding Application No. GB2005636.2 dated Jan. 7, 2021.
Office Action issued on Apr. 18, 2024, by the Canadian Patent Office in corresponding Canadian Patent Application No. 3,180,195. (4 pages).
First Office Action issued on May 21, 2024, by the Japanese Patent Office in corresponding Japanese Patent Application No. 2022-563052, and an English Translation of the Office Action. (12 pages).
Office Action (Examination report No. 1 for your standard patent application) issued Oct. 16, 2023, by the Australian Government, IP Australia in corresponding Australian Patent Application No. 2021255118. (4 pages).
Office Action (Communication) issued on Nov. 19, 2024, by the European Patent Office in corresponding European Patent Application No. 21 719 909.0. (8 pages).

* cited by examiner

MULTITEMPERATURE STORAGE SYSTEM

The invention relates to a storage system comprising regions which are configured to be maintained at different temperatures from one another.

This application claims priority from UK patent application GB2005636.2 filed on 17 Apr. 2020, the contents of which are hereby incorporated by reference

BACKGROUND

The claimed apparatus, methods, systems and computer programs are intended to provide improvements relating to storage systems.

SUMMARY

There is provided a multitemperature storage system as claimed in claim 1. There is also provided a method as claimed in claim 12. There is further provided a controller as claimed in claim 14. There is additionally provided a computer-readable storage medium as claimed in claim 18. Optional features are set out in the dependent claims.

BRIEF DESCRIPTION OF THE DRAWINGS

The multitemperature storage system will now be described in detail with reference to examples, in which.

DETAILED DESCRIPTION

The following examples represent the applicant's preferred examples of how to implement multitemperature storage systems, but they are not necessarily the only examples of how that could be achieved.

Figure 1:
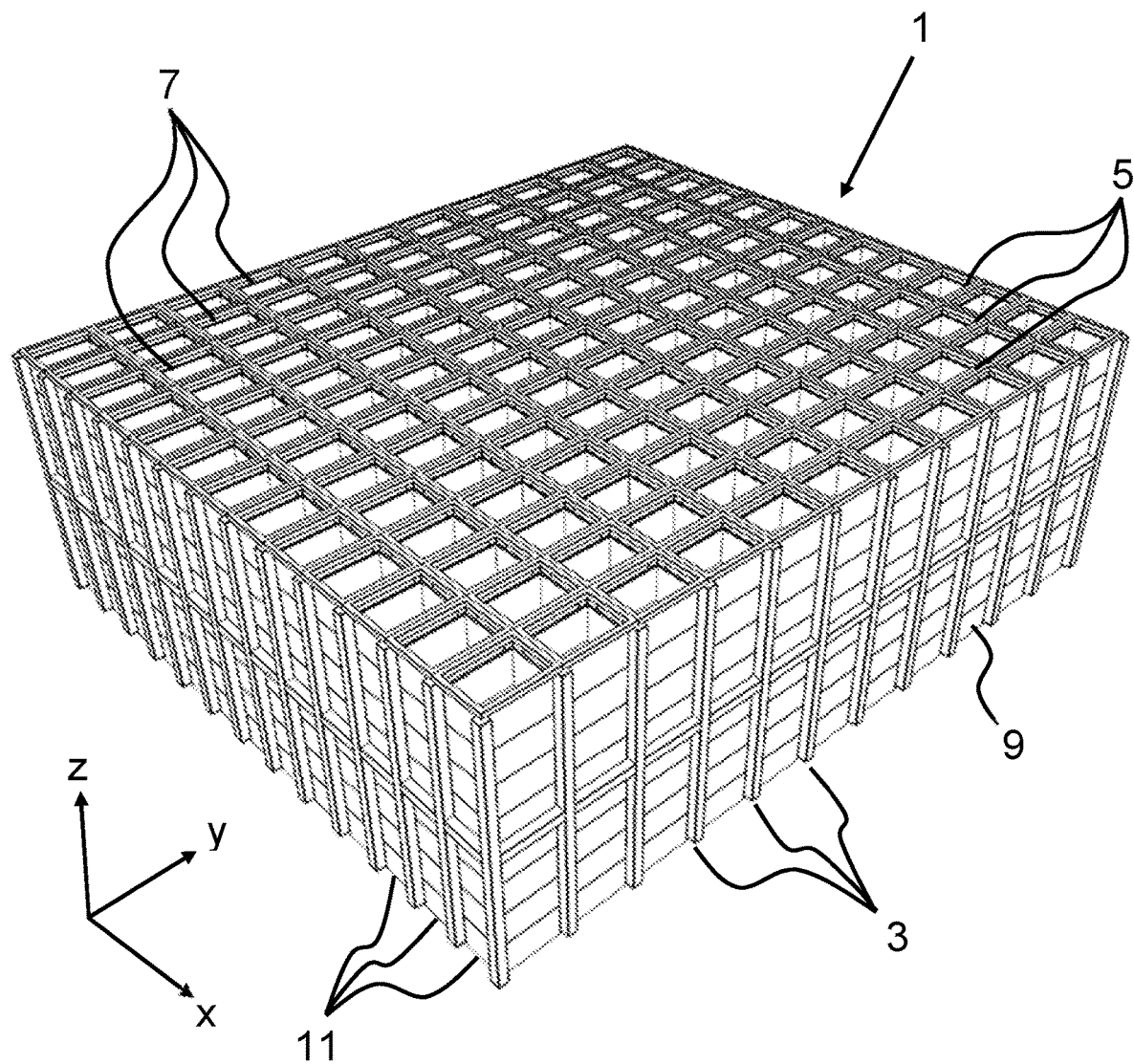
FIG. 1 schematically illustrates a storage structure and containers.

FIG. 1 illustrates a storage structure 1 comprising upright members 3 and horizontal members 5, 7 which are supported by the upright members 3. The horizontal members 5 extend parallel to one another and the illustrated x-axis. The horizontal members 7 extend parallel to one another and the illustrated y-axis, and transversely to the horizontal members 5. The upright members 3 extend parallel to one another and the illustrated z-axis, and transversely to the horizontal members 5, 7. The horizontal members 5, 7 form a grid pattern defining a plurality of grid cells. In the illustrated example, containers 9 are arranged in stacks 11 beneath the grid cells defined by the grid pattern, one stack 11 of containers 9 per grid cell.

Figure 2:
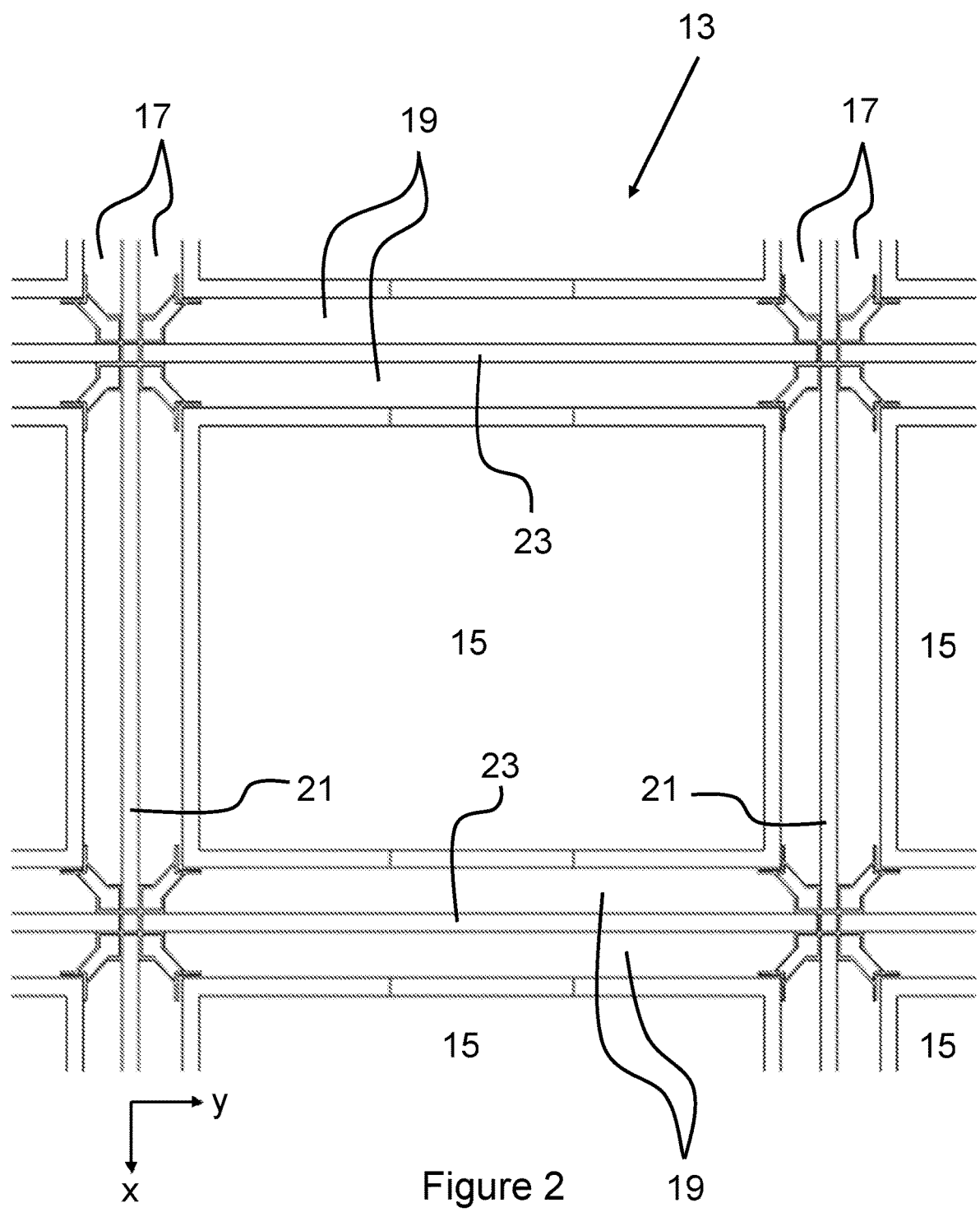
FIG. 2 schematically illustrates track on top of the storage structure illustrated in FIG. 1.

FIG. 2 shows a large-scale plan view of a section of track structure 13 forming part of the storage structure 1 illustrated in FIG. 1 and located on top of the horizontal members 5, 7 of the storage structure 1 illustrated in FIG. 1. The track structure 13 may be provided by the horizontal members 5, 7 themselves (e.g. formed in or on the surfaces of the horizontal members 5, 7) or by one or more additional components mounted on top of the horizontal members 5, 7. The illustrated track structure 13 comprises x-direction tracks 17 and y-direction tracks 19, i.e. a first set of tracks 17 which extend in the x-direction and a second set of tracks 19 which extend in the y-direction, transverse to the tracks 17 in the first set of tracks 17. The tracks 17, 19 define apertures 15 at the centres of the grid cells. The apertures 15 are sized to allow containers 9 located beneath the grid cells to be lifted and lowered through the apertures 15. The x-direction tracks 17 are provided in pairs separated by channels 21, and the y-direction tracks 19 are provided in pairs separated by channels 23. The illustrated channels 21, 23 are defined by pairs of lips protruding upwardly (i.e. at least partially in the z-direction) from the surfaces of the tracks 17, 19. However, in other examples, the channels may be defined differently. In some examples channels may not be provided to separate neighbouring tracks. Instead, there may be a continuous surface forming the neighbouring tracks with an empty stretch of the continuous surface between the neighbouring tracks, or the neighbouring tracks may be formed of separate surfaces and gaps may be provided between the separate surfaces.

Figure 3:
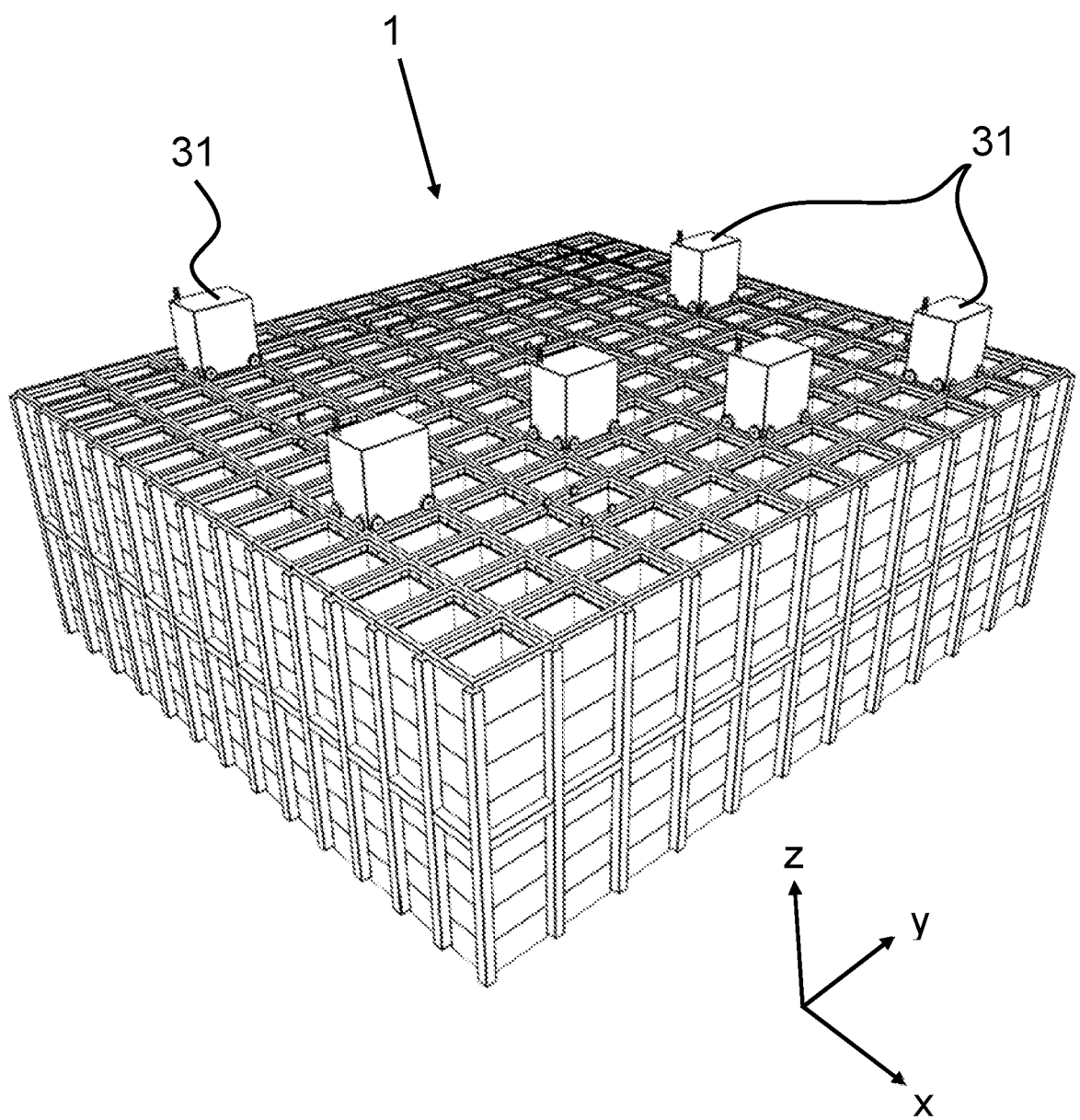
FIG. 3 schematically illustrates load-handling devices on top of the storage structure illustrated in FIG. 1.

FIG. 3 shows a plurality of load-handling devices 31 moving on top of the storage structure 1 illustrated in FIG. 1. The load-handling devices 31, which may also be referred to as robots 31 or bots 31, are provided with sets of wheels to engage with corresponding x- or y-direction tracks 17, 19 to enable the bots 31 to travel across the track structure 13 and reach specific grid cells. The illustrated pairs of tracks 17, 19 allow bots 31 to occupy (or pass one another on) neighbouring grid cells without colliding with one another.

Figure 4:
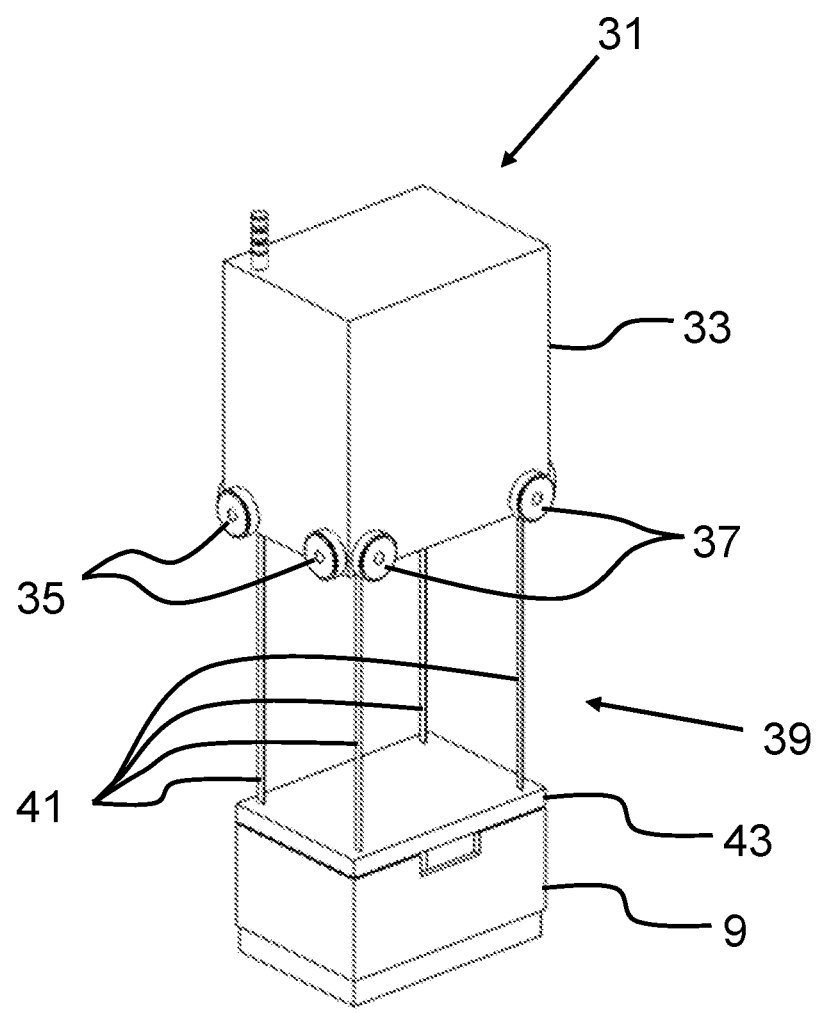
FIG. 4 schematically illustrates a single load-handling device with container-lifting means in a lowered configuration.

As illustrated in detail in FIG. 4, a bot 31 comprises a body 33 in or on which are mounted one or more components which enable the bot 31 to perform its intended functions. These functions may include moving across the storage structure 1 on the track structure 13 and raising or lowering containers 9 (e.g. from or to stacks 11) so that the bot 31 can retrieve or deposit containers 9 in specific locations defined by the grid pattern.

The illustrated bot 31 comprises first and second sets of wheels 35, 37 which are mounted on the body 33 of the bot 31 and enable the bot 31 to move in the x- and y-directions, respectively, along the tracks 17 and 19, respectively. In particular, two wheels 35 are provided on the shorter side of the bot 31 visible in FIG. 4, and a further two wheels 35 are provided on the opposite shorter side of the bot 31 (side and further two wheels 35 not visible in FIG. 4). The wheels 35 engage with tracks 17 and are rotatably mounted on the body 33 of the bot 31 to allow the bot 31 to move along the tracks 17. Analogously, two wheels 37 are provided on the longer side of the bot 31 visible in FIG. 4, and a further two wheels 37 are provided on the opposite longer side of the bot 31 (side and further two wheels 37 not visible in FIG. 4). The wheels 37 engage with tracks 19 and are rotatably mounted on the body 33 of the bot 31 to allow the bot 31 to move along the tracks 19.

The bot 31 also comprises container-lifting means 39 configured to raise and lower containers 9. The illustrated container-lifting means 39 comprises four tapes or reels 41 which are connected at their lower ends to a container-gripping assembly 43. The container-gripping assembly 43 comprises gripping means (which may, for example, be provided at the corners of the assembly 43, in the vicinity of the tapes 41) configured to engage with features of the containers 9. For instance, the containers 9 may be provided with one or more apertures in their upper sides with which the gripping means can engage. The gripping means may be configured to hook under the rims or lips of the containers 9, and/or to clamp or grasp the containers 9. The tapes 41 may be wound up or down to raise or lower the gripping assembly, as required.

Figure 5:
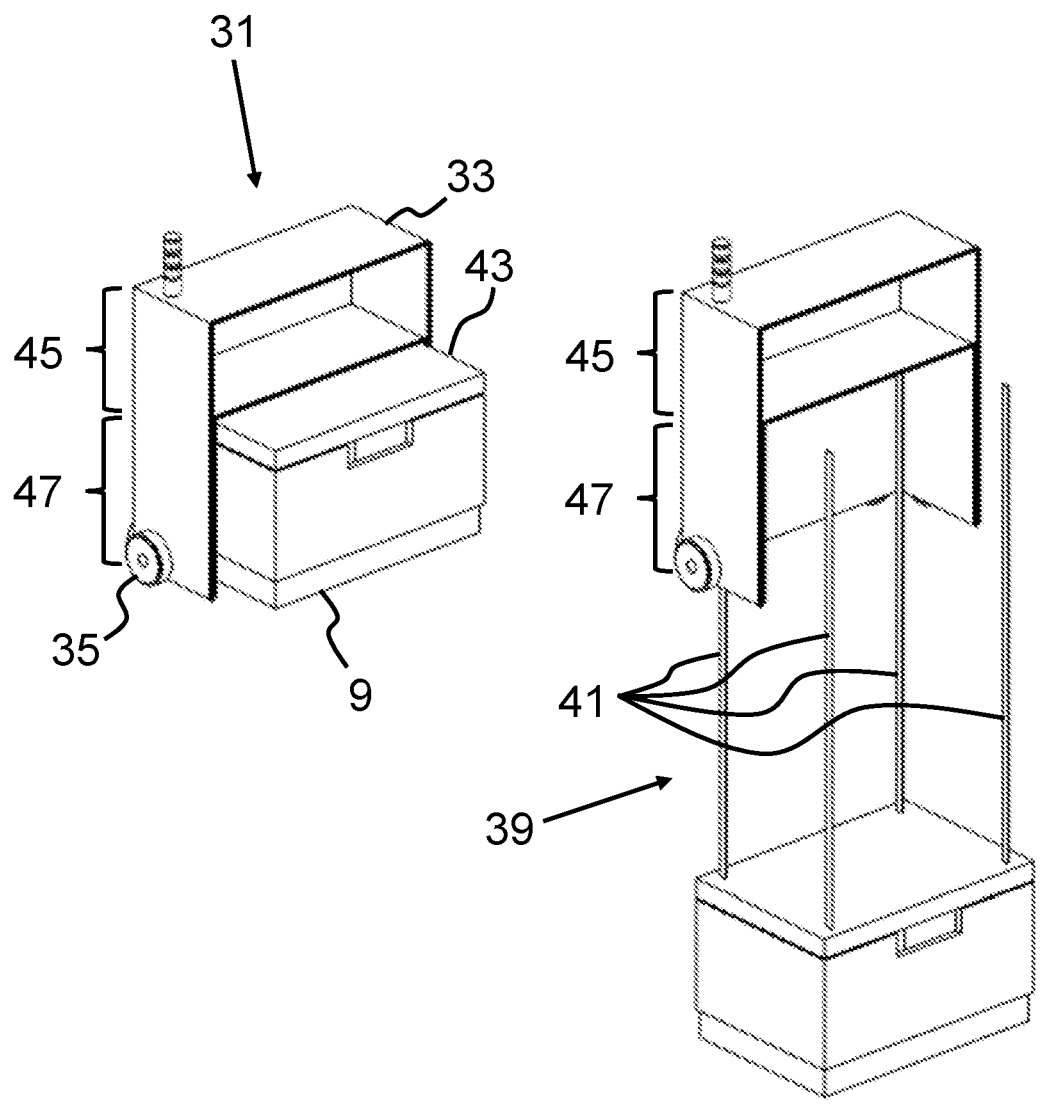
FIG. 5 schematically illustrates cutaway views of a single load-handling device with container-lifting means in a raised and a lowered configuration.

As can be seen in FIG. 5, the body 33 of the bot 31 includes a space or cavity for receiving a container 9 that has been raised by the container-lifting means 39. The cavity is sized such that enough of a container 9 can fit inside the cavity to enable the bot 31 to move across the track structure 13 on top of storage structure 1 without the underside of the container 9 catching on the track structure 13 or another part of the storage structure 1. When the bot 31 has reached its intended destination, the container-lifting means 39 controls the tapes 41 to lower the container-gripping assembly 43 and the corresponding container 9 out of the cavity in the lower portion 47 and into the intended position. The intended position may be a stack 11 of containers 9 or an egress point of the storage structure 1 (or an ingress point of the storage structure 1 if the bot 31 has moved to collect a container 9 for storage in the storage structure 1). Although in the illustrated example the upper and lower portions 45, 47 are separated by a physical divider, in other embodiments, the upper and lower portions 45, 47 may not be physically divided by a specific component or part of the body 33 of the bot 31.

Figure 6:
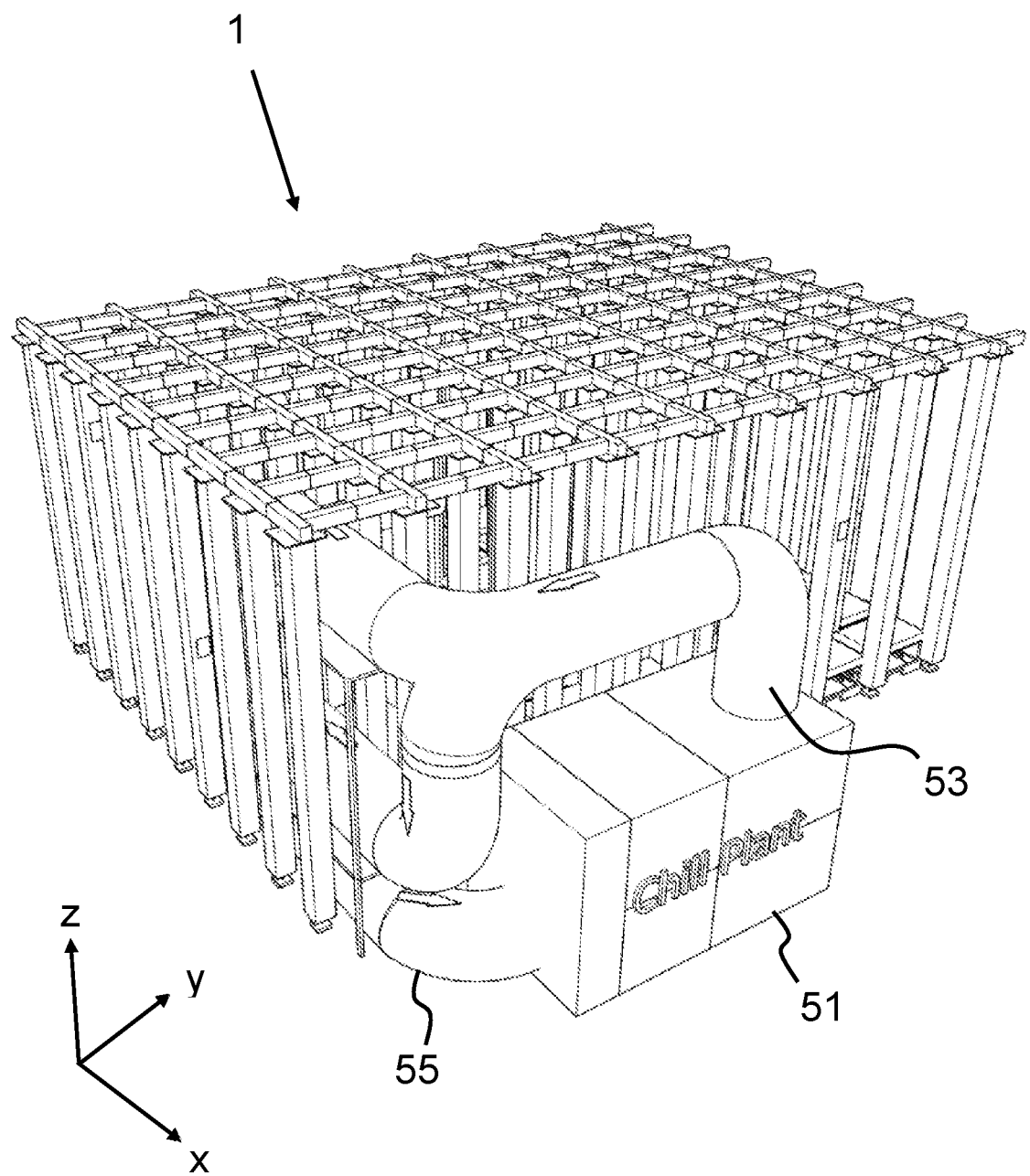
FIG. 6 schematically illustrates in perspective view a section of storage structure with temperature-control means.

FIG. 6 schematically illustrates a storage structure 1 with temperature-control means including a chill plant 51. The chill plant 51 chills air to a specified temperature and directs the chilled air along ducting 53 to one or more locations in or beside the storage structure 1. Air is returned to the chill plant 51 from the storage structure 1 along ducting 55, e.g. for re-chilling and re-circulating. The ducting 53 which directs chilled air from the chill plant 51 to the storage structure 1 may be referred to as outbound ducting 53 and the ducting 55 which returns air from the storage structure 1 to the chill plant 51 may be referred to as return ducting 55.

Figure 7:
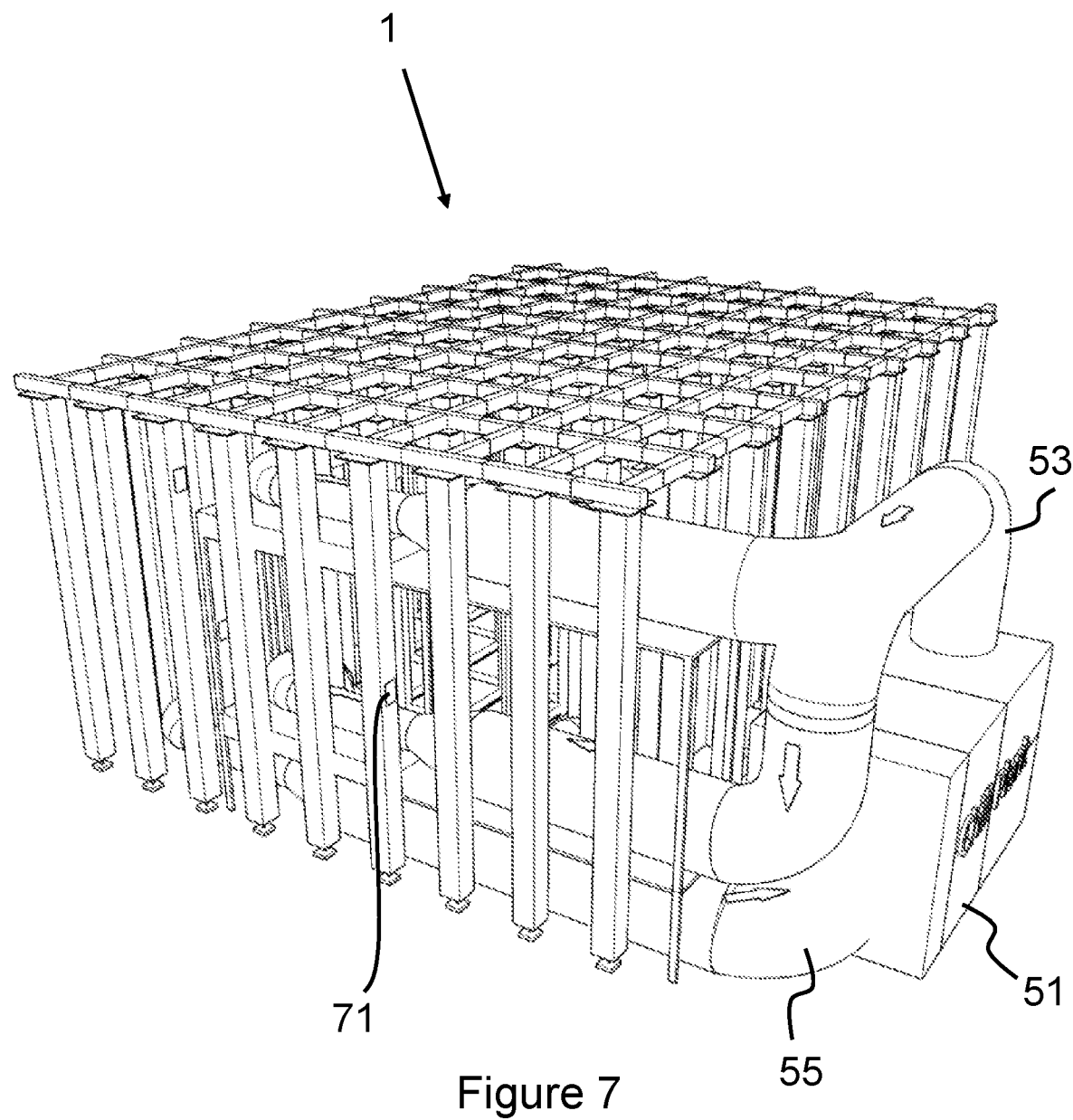
FIG. 7 schematically illustrates in a different perspective view the storage structure and temperature-control means of FIG. 6.
Figure 8:
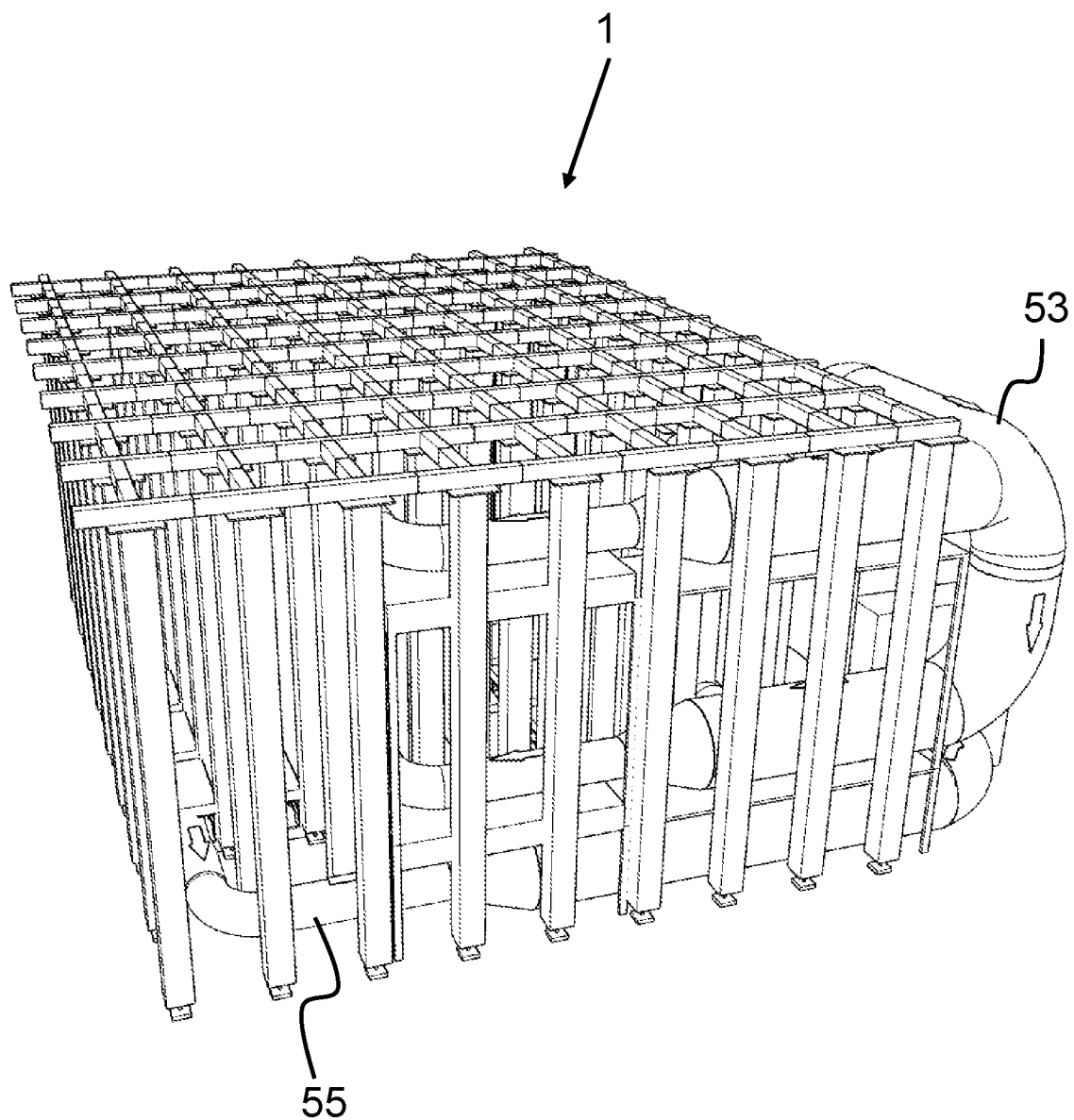
FIG. 8 schematically illustrates in a different perspective view the storage structure and temperature-control means of FIG. 6 and FIG. 7.

As can be seen in more detail in FIG. 7 and FIG. 8, the outbound ducting 53 includes multiple branches which diverge from a single outlet of the chill plant 51 and direct chilled air from the chill plant 51 to different regions in the storage structure 1. For example, one branch of the outbound ducting 53 may direct chilled air from the chill plant 51 to the top of a stack 11 of containers 9 via an outlet of the ducting 53.

The chilled air may then descend to the bottom of the stack, chilling the products in the containers 9 in the stack. Multiple branches of the ducting 53 may in some examples be directed to the same region. For example, a region of the storage structure 1 which needs to be maintained at a particularly low temperature or whose temperature must be particularly stable (i.e. subject to minimal fluctuations) may have two or more branches of ducting, with corresponding outlets, directed to the region. If, for instance, a particular stack 11 needs to be kept at a low temperature, two or more branches of the ducting 53 may be directed to the top of the stack 11, with outlets allowing chilled air to flow out of the branches onto the stack 11. For example, four branches may direct air to the same stack, with one branch being directed to each of the four sides of the stack 11 (although other permutations, such as two branches to one side and a further two branches to a different side, are also possible). If necessary, additional branches of the ducting 53 may direct chilled air to different heights within the same stack 11. For example, one or more branches may direct chilled air to the top of the stack 11, and one or more additional branches may direct chilled air to a point lower down the stack 11, e.g. half-way down the stack 11 or at or near the bottom of the stack 11.

Figure 9:
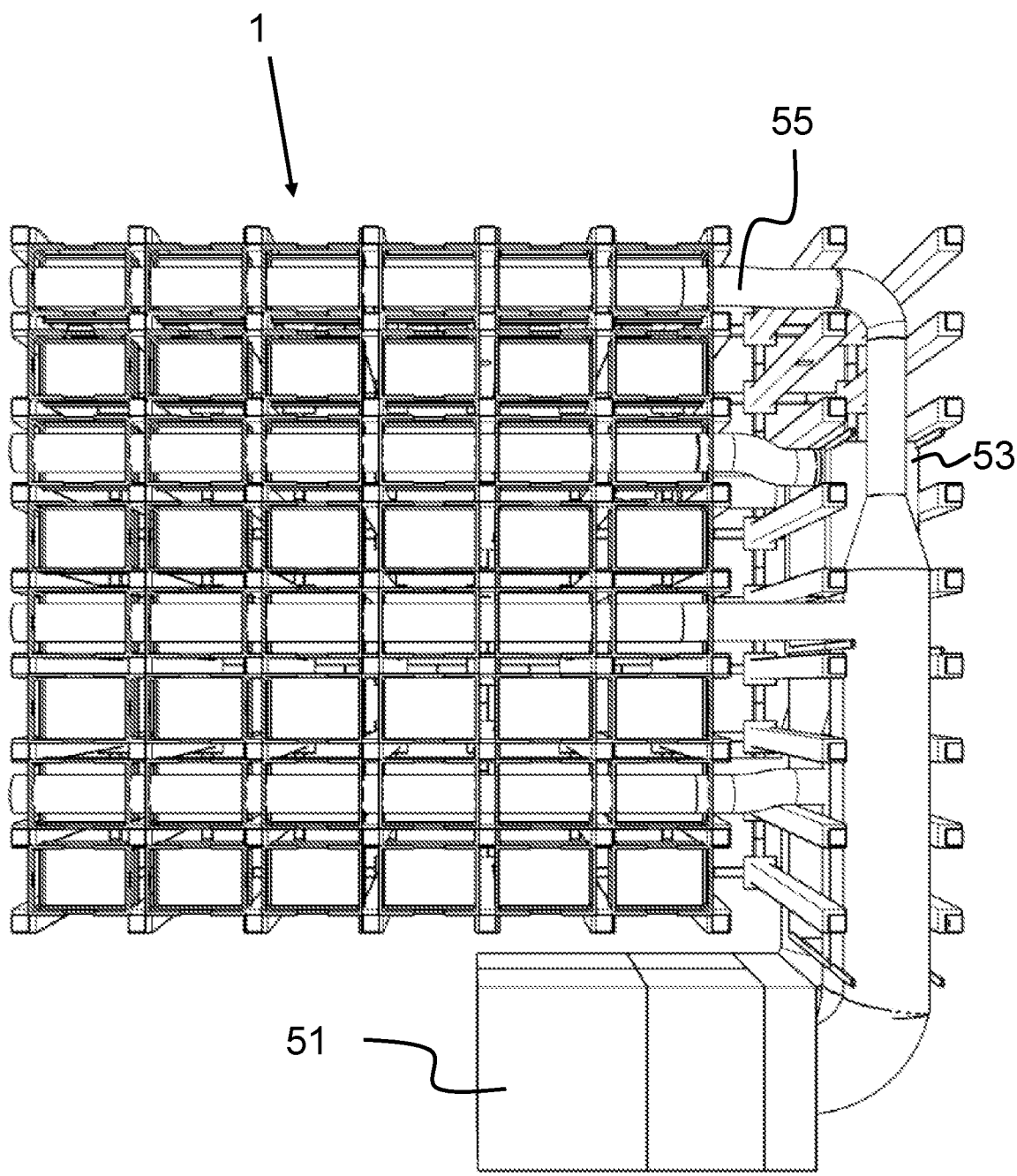
FIG. 9 schematically illustrates the underside of the storage structure of FIG. 6 to FIG. 8.

Analogously, and as can be seen more clearly in FIG. 9, the return ducting 55 may include multiple branches which collect air from different regions of the storage structure 1 and return the collected air to the chill plant 51. Analogously to the outbound ducting 53, the multiple branches of the return ducting 55 may converge to enter a single inlet of the chill plant 51. The return ducting 55 may preferably be located at or towards the bottom of the storage structure 1 (i.e. towards the negative end of the z-axis illustrated in FIG. 6) to take advantage of the falling movement of the chilled air from the outbound ducting 53.

To assist with expelling air from the outbound ducting 53 and/or drawing air into the return ducting 55, the ducting 53, 55 may be provided with one or more fans, pumps or other flow aids to assist with air flow in the desired directions. For example, there may be a fan located at the outlet of one or more branches of the outbound ducting 53 to direct air out of the corresponding branch and into the desired region of the storage structure 1 (e.g. to the top of a stack 11 of containers 9). This may advantageously allow use of wind chill to cool the target goods. Using wind chill may mean that the chill plant 51 can chill air to a higher temperature and still allow the temperature-control means to achieve the desired cooling of the relevant goods in the storage structure 1. Analogously, there may be a fan located at the inlet of one or more branches of the return ducting 55 to draw air out of the relevant region of the storage structure 1 and into the corresponding branch, towards the chill plant 51. The flow aids may be speed-controllable, i.e. to increase or decrease the level of flow provided by the aids at different times, e.g. to adjust the cooling provided depending on the products being stored in a stack 11 at a given time.

As can be seen in FIG. 7 to FIG. 9, the ducting 53, 55 may have different diameters along the length of the ducting 53, 55 (i.e. between the chill plant 51 and the inlet/outlet at the storage structure 1). This may advantageously help to control the flow along the ducting 53, 55. For example, where the ducting 53, 55 diverges into or converges from multiple branches, the diameter of the ducting 53, 55 may change to help maintain the relevant pressure and flow rates along the ducting 53, 55 towards other branches or the chill plant 51.

One or more valves may be provided in the ducting 53, 55 to help control air flow along the ducting 53, 55. For example, in some circumstances, it may be desirable to stop flow along a particular branch of the outbound ducting 53, e.g. if a different branch needs more chilled air to achieve a specific temperature in the different branch's target region for a period of time. The valve may be closed for the duration of that period of time and reopened when desired. The extent to which a given valve is open may be controllable, to give finer-grained flow control and pressure control and/or to allow some cooling capacity to be diverted from a first branch to a second branch but without completely removing the cooling capacity from the first branch.

In the illustrated embodiment, the chill plant 51 includes only a single outlet, to which the ducting 53 is connected to direct chilled air from the chill plant 51 to the storage structure 1. In other examples, a chill plant may include multiple outlets to which multiple different sections of ducting may be connected. This may be particularly useful in examples where the chill plant chills air to more than one temperature. For example, a single chill plant may be provided with the necessary hardware (e.g. pumps, refrigerant, chambers, etc) to produce air at a suitable temperature for chilling a region of the storage structure 1 to a "freezer" temperature (e.g. an at-or-below-freezing point temperature, such as in the range −30° C. to 0° C.) and air at a suitable temperature for chilling a region of the storage structure 1 to a "fridge" temperature (e.g. an at-or-above-freezing point temperature, such as in the range 0° C. to 10° C.).

Alternatively or additionally, a storage structure 1 may be provided with a plurality of separate chill plants. Each chill plant may have one or more outlets (for providing chilled air to the corresponding storage structure 1 via outbound ducting) and one or more inlets (for receiving air from the corresponding storage structure 1), with corresponding ducting where appropriate. The chill plants may be located around the periphery of the storage structure 1, as in the example of FIG. 6 to FIG. 9, or may be located elsewhere. For instance, in some examples, one or more chill plants may be located within the storage structure 1. For example, a chill plant may be located at the base of a stack 11 of containers 9, with outbound ducting to direct chilled air from the chill plant to the top of the stack 11. In such an example, return ducting may not be necessary—the chill plant may instead have a top- or side-wall with an inlet and possibly a flow aid (e.g. fan) to draw chilled air down the stack 11 to cool the contents of the containers 9 and then into the chill plant for re-chilling and re-circulating. In other examples, a chill plant may be located elsewhere within the storage structure 1. For instance, in some examples, a chill plant may be mounted on a mezzanine floor within the storage structure or on the storage structure itself. This may advantageously mean that the path of chilled air from the chill plant to the goods to be chilled can be shortened, i.e. that less outbound ducting is required. In general, the location of any chill plant which provides chilled air to a region of a storage structure 1 may be chosen to minimise the distance that the chilled air must travel to the target region and/or the distance that the chilled air must travel to return to the chill plant. Advantageously this may minimise energy losses and/or temperature changes as the chilled air travels along the ducting and/or may minimise the length of ducting that is required to provide and recover the chilled air. However, in some cases, it may be more energy efficient to provide a larger chill plant which is arranged to supply multiple regions via longer lengths of ducting.

In some instances, a chill plant may be positioned in a space within or adjacent to the storage structure 1 which has already been rendered "dead" (i.e. not usable for storing containers 9) by another component, such as a picking station to which containers 9 are directed for goods to be added or removed from the containers 9. For example, a chill plant may be located immediately below or above a picking station located on a mezzanine within the storage structure 1. In such examples, containers 9 may still be stored in the storage structure 1 above or below the chill plant and retrieved from the storage structure 1 by bots 31 or other means, such as conveyors and extraction ports on the underside of or beside the storage structure 1. Providing multiple chill plants may advantageously provide some redundancy, which may allow maintenance, emergency downtime or other shutdowns to be accommodated. For instance, a chill plant may need regular defrosting; the presence of a second chill plant may allow the first chill plant to be shut down for the defrosting to be completed while still maintaining one or more regions of the storage structure 1 within a tolerable variation of the target temperature. In some examples, chill plants may be provided which can be stored in one or more containers 9 and placed within the storage structure 1 at appropriate locations to achieve temperature control of the surrounding regions.

A chill plant may be controllable, e.g. in terms of throughput, temperature or other variables. For example, it may be possible to change the output temperature of chilled air from a chill plant, and/or to change the speed at which chilled air is expelled from the chill plant or at which returned air is drawn back into the chill plant (e.g. by flow aids located at or in the chill plant). This controllability may enable a single chill plant to be used to provide appropriate cooling for different regions of the storage structure 1 at different times or in different configurations.

The ducting 53, 55 may be provided with insulation or other surrounding material to help control radiation from and/or conductivity through the ducting 53, 55. In some configurations, the outbound ducting 53 in particular may benefit from being well insulated so that as much of the benefit of the cooled air is delivered to the target region as possible, i.e. the cooling benefit is not lost to the regions surrounding the ducting 53 by radiation. In other configurations, such as configurations in which the outbound ducting 53 has multiple outlets to different regions of the storage structure 1, it may be desirable for the outbound ducting 53 to radiate along its length, i.e. so that the cooling benefit is spread along the length of the ducting 53 to the different parts of the storage structure 1 through which it passes. Such configurations may advantageously produce a more even temperature across a larger region of the storage structure 1.

The ducting 53, 55 may pass through the storage structure 1 at different levels. For example, as described above, outbound ducting 53 may be directed to a top of a stack 11 of containers 9. However, the outbound ducting 53 may additionally or alternatively be directed to other heights in a stack 11. Similarly, although in some configurations it may be preferable for the return ducting 55 to be located at or towards the bottom of the storage structure 1 (e.g. since the direction of travel of the chilled air from the outbound ducting 53 will generally be in a downwards direction), it may be desirable in some circumstances for the return ducting 55 to be at a different height or different heights. The ducting 53, 55 may preferably extend substantially along one row of the storage structure 1. That row may be designated a "movement" row of the storage structure 1 for bots 31 on top of the storage structure 1. This may advantageously minimise additional constraints on where in the storage structure 1 containers 9 can be stored when ducting 53, 55 and/or a chill plant are located inside the storage structure 1. In particular, a bot 31 which has to travel a large number of grid cells in the direction of extension of the row with the ducting 53, 55 may preferentially travel along that row, leaving the other rows exposed for other bots 31 to access the containers 9 stored there.

In some embodiments, multiple outlets may be provided on one length of outbound ducting 53. Different outlets on the ducting 53 may belong to or define different temperature regions of the storage structure 1. For instance, a coldest region may be defined by the ducting outlet which is closest to the corresponding chill plant; a next-coldest region may be defined by the ducting outlet which is next-closest to the chill plant; and a warmest zone may be defined by the ducting outlet which is farthest from the chill plant. In embodiments where there are multiple chill plants and/or multiple branches of ducting, one region may be served and/or defined by more than one ducting outlet. For example, if multiple chill plants are located along one side of the storage structure 1, their corresponding outbound ducting may extend parallel to one another into the storage structure 1 at corresponding distances into the storage structure 1, or at different distances into the storage structure 1, to define and serve different regions of temperature. In some embodiments, a chill plant may be located inside a storage structure 1, in which case the boundaries of the different-temperature regions may be defined as concentric shapes (e.g. quadrilaterals), expanding outwards from the chill plant.

One or more of the components of the illustrated multi-temperature storage systems including temperature-control means may be located under a floor. For example, in some embodiments, the return ducting 55 may be located under a false floor which may, for instance, serve as a base on which the containers 9 in the stacks 11 sit. The false floor may include apertures to allow air to pass through the false floor into the inlets of the return ducting 55. Alternatively or additionally, apertures in the false floor may allow air to pass through the false floor from outlets of the outbound ducting 53. For example, in some embodiments, both the outbound ducting 53 and the return ducting 55 may be located below the false floor. This may advantageously mean that more of the space inside the storage structure 1 is available for the storage of containers 9 and movement of the containers 9 within the storage structure 1 is less restricted. Different types of aperture may be provided in the false floor for the different types of ducting 53, 55. For example, it may be advantageous for there to be larger apertures for the outbound ducting 53 and smaller apertures for the return ducting 55, or vice versa.

Figure 10:
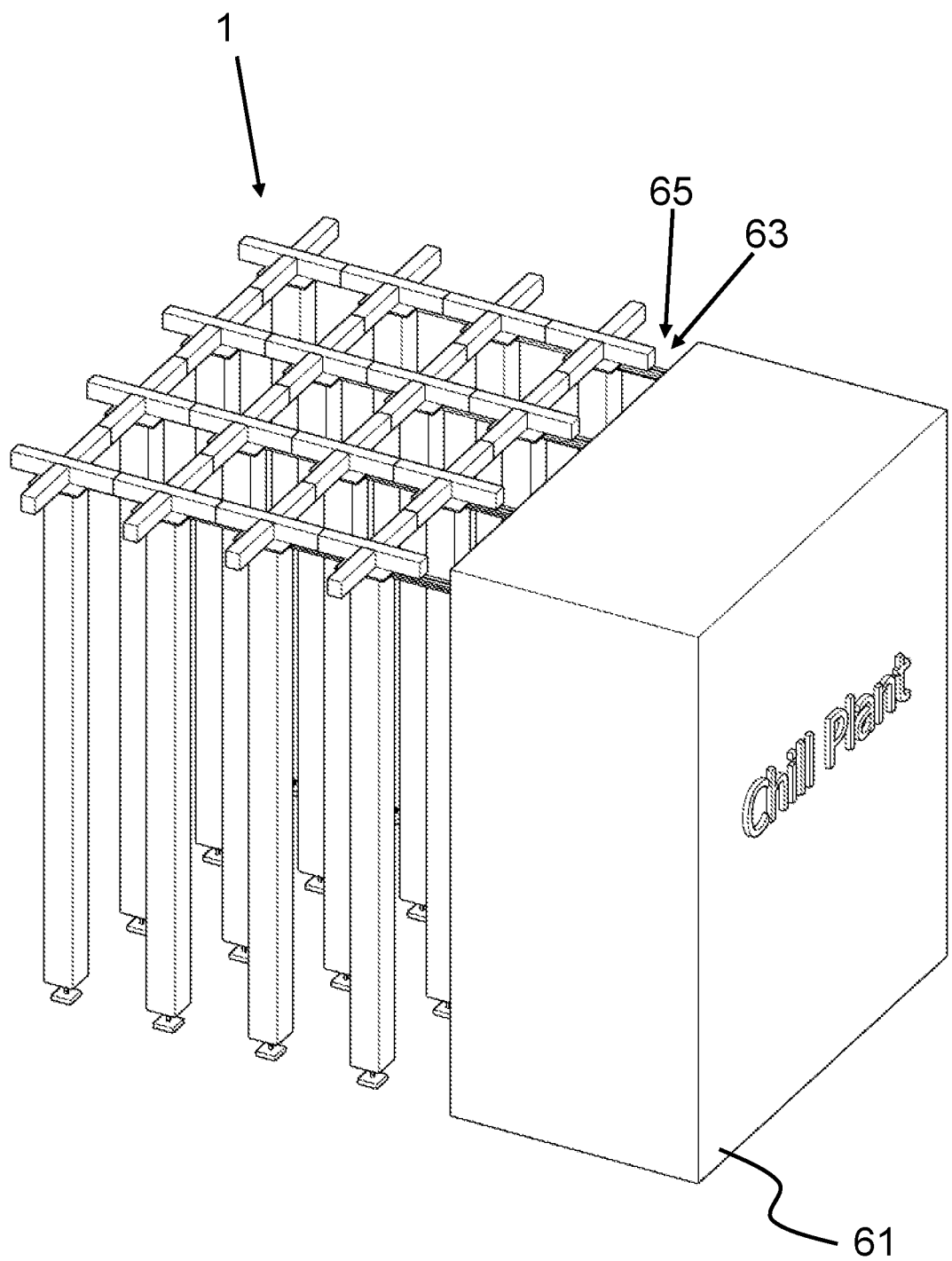
FIG. 10 schematically illustrates in perspective view a storage structure with temperature-control means.

FIG. 10 schematically illustrates another example of a storage structure 1 with temperature-control means including a chill plant 61. Piping 63, 65 is configured to direct chilled fluid (such as liquid nitrogen, ethylene glycol or another suitable substance) from the chill plant 61 to one or more regions of the storage structure 1, and then back to the chill plant 61 to be re-chilled and re-circulated. The illustrated arrangement is analogous to the arrangement illustrated in FIG. 6 to FIG. 9 in that outbound tubing 63 carries chilled fluid from the chill plant 61 to the storage structure 1 and return tubing 65 carries the fluid back from the storage structure 1 to the chill plant 61.

Figure 11:
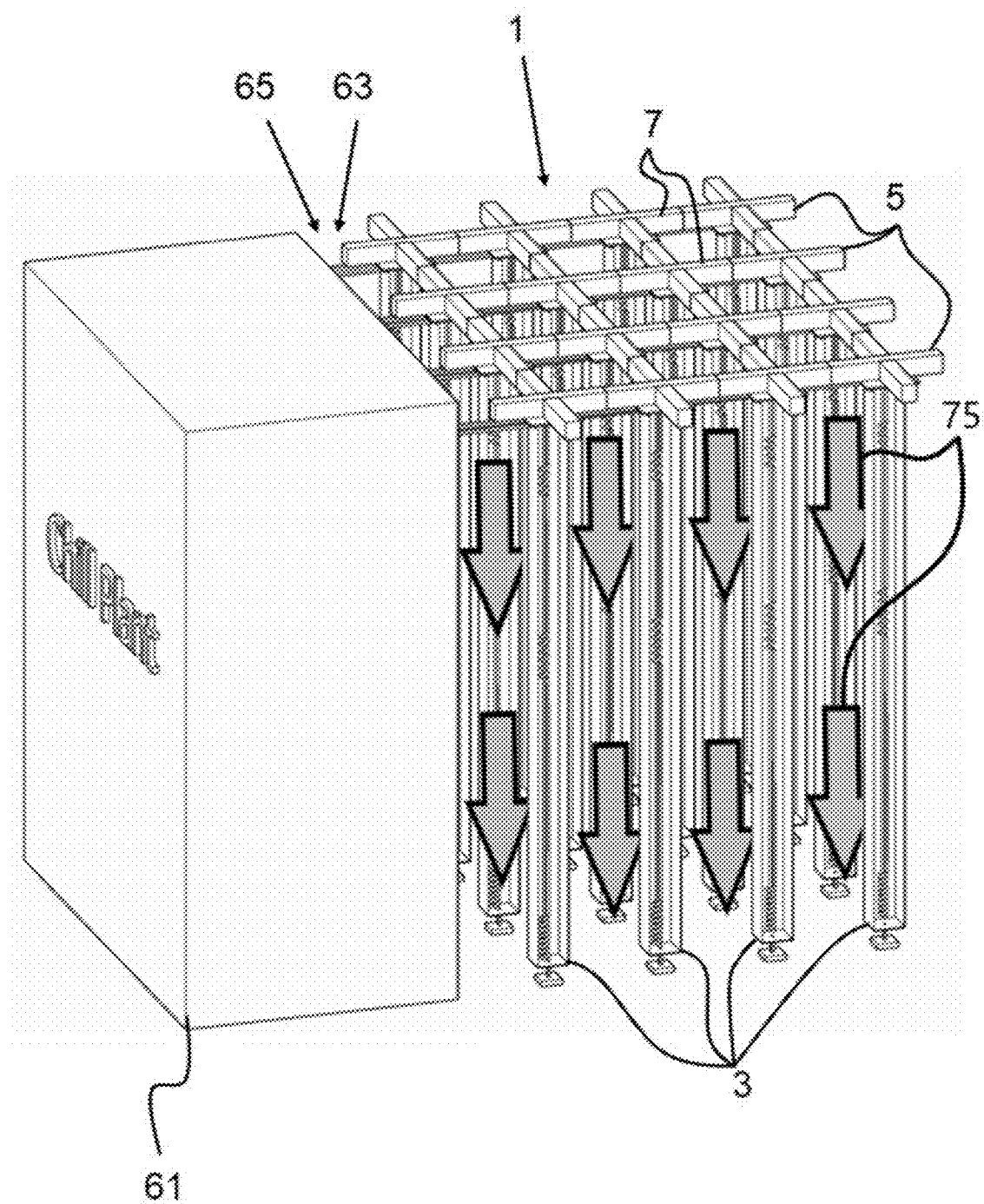
FIG. 11 schematically illustrates in perspective view the storage structure and temperature-control means of FIG. 10.
Figure 12:
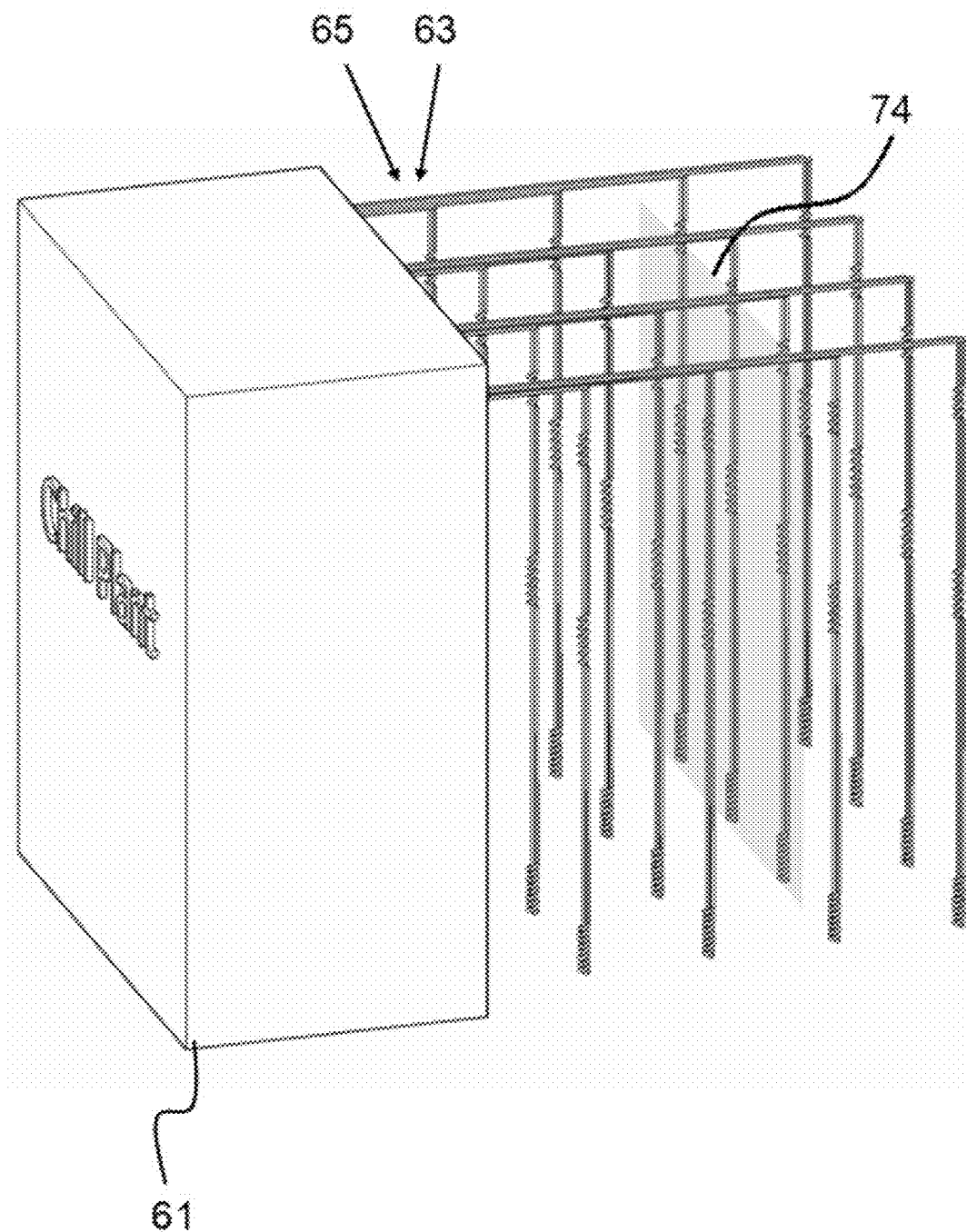
FIG. 12 schematically illustrates in perspective view the temperature-control means of FIG. 10 and FIG. 11.

As shown in more detail in FIG. 11 and FIG. 12, the tubing 63, 65 may, along at least some of its length, be located within components of the storage structure 1, such as within upright members 3 which support horizontal members 5, 7. In FIG. 11, the side faces of the upright members 3 have been removed to show the tubing 63, 65 within the upright members 3; in FIG. 12 the upright members 3 have been removed altogether to reveal more of the tubing 63, 65. Locating the tubing 63, 65 within components of the storage structure 1 may advantageously minimise how much the tubing 63,65 restricts container 9 access and storage. For example, tubing 63, 65 located within the upright members 3 should not restrict the movement of containers 9 up and down stacks 11 within the storage structure 1.

In the example illustrated in FIG. 11 and FIG. 12, the tubing 63, 65 includes straight sections and helical sections. In general, the tubing 63, 65 may be provided with any shape or configuration to achieve particular temperature-control objectives. The outbound tubing 63 in particular may preferably be provided with shaped sections. For example, helical sections, which concentrate the volume of cooling fluid in a particular region, may be provided in regions where greater cooling is required. In other examples, differently-shaped sections may be provided, and multiple differently-shaped sections may be present in one arrangement. For example, in some arrangements, it may be desirable to have one or more of straight sections, helical sections, zigzag sections, meandering or oscillating sections and/or other sections, all in the same arrangement of tubing 63, 65.

In the illustrated example, the outbound tubing 63 and the return tubing 65 form a set of continuous, closed loops through which the cooling fluid flows away from the chill plant 61 and back to the chill plant 61. The outbound tubing 63 may be regarded as "beginning" at the chill plant 61 and "ending" at a point in the respective loop which is farthest from the chill plant 61, or at some other point, e.g. a point where the fluid reaches its highest temperature. Beyond that point (in the direction of fluid flow around the respective closed loop), the tubing may be regarded as the return tubing 65 which returns the fluid to the chill plant 61. The temperature of the fluid in the outbound tubing 63 is generally expected to be lower than the temperature of the fluid in the return tubing 65. As the fluid in the outbound tubing 63 passes through the region(s) of the storage structure 1 it is intended to cool, it radiates cool into the region(s) and its own temperature increases. The continuous, closed loops may include only a single path or may include multiple paths or branches, like the branches described in the context of FIG. 6 to FIG. 9 but closed. For example, in the context of a row of upright members 3 of a storage structure 1, outbound tubing 63 may supply multiple branches, each of which passes through a respective upright member 3 of the storage structure 1 and joins common return tubing 65 to return to the chill plant 61. It may be expected that substantially all of the cooling fluid which leaves a chill plant 61 and travels along a closed loop formed by outbound tubing 63 and return tubing 65 returns to the chill plant 61. By contrast, it may be expected that some of the cooling fluid which leaves a chill plant 51 and travels along outbound ducting 53 may not return to the chill plant 51, or may only return to the chill plant 51 at a later time, since the outbound ducting 53 and the return ducting 55 form an "open" loop rather than a "closed" loop. In other words, it may be expected that substantially none of a cooling fluid travelling along a closed loop as defined by outbound tubing 63 and return tubing 65 leaks out of the closed loop, whereas it may be expected that some of the cooling fluid travelling along the outbound portion 53 of an open loop may leak out of the open loop, i.e. may not immediately enter the return portion 55 of the open loop.

Analogously to the ducting 53, 55 in the examples of FIG. 6 to FIG. 9, the paths of the tubing 63, 65 may be chosen to minimise the distance between the chill plant 61 and particular parts of the outbound tubing 63 (e.g. shaped parts where the fluid is concentrated to provide greater cooling, such as the helical sections illustrated in FIG. 11 and FIG. 12), and/or to minimise other distances, such as the length of the return tubing 65. The relative locations of the outbound tubing 63 and the return tubing 65 may be chosen to minimise their impact on each other. In the illustrated embodiments, the return tubing 65 is substantially central in the upright members 3 and the helical sections of outbound tubing 63 may coil around the return tubing 65, so that the outbound tubing 63 is closest to the outside surfaces of the upright members 3 and therefore to the goods stored in the containers 9 (which need to be chilled by the outbound tubing 63). This may advantageously improve the chilling effect provided by the tubing 63, 65.

In some embodiments, smaller chill plants may be provided at one or more points around the closed loops, e.g. at the farthest points from the chill plant(s) 61, within the upright members 3 or elsewhere inside the storage structure 1, e.g. in containers 9 placed at appropriate locations within the storage structure 1, so that the fluid is re-chilled part-way along the closed loop, e.g. for the fluid's return to the chill plant 61.

Analogously to the chill plant 51 and ducting 53, 55 described above in the context of FIG. 6 to FIG. 9, multiple chill plants 61 may be provided to supply the different closed loops of tubing 63, 65. For example, a first chill plant 61 may be located adjacent to one row of the storage structure 1 to supply chilled fluid to one or more closed loops along that row of the storage structure 1; a second chill plant 61 may be located adjacent to the next row of the storage structure 1 to supply chilled fluid to one or more closed loops along that row of the storage structure 1, etc. Alternatively or additionally, one or more chill plants 61 may be provided on each side of the storage structure 1 to provide chilled fluid to corresponding closed loops. This may advantageously help to reduce the distance travelled by chilled fluid before it reaches its target chilling region.

Although the illustrated examples include multiple closed loops (one for each upright member 3 of the storage structure 1 in the particular example illustrated), each closed loop having corresponding outbound tubing 63 and return tubing 65, in other examples it may be preferable to have fewer closed loops or even a single closed loop along which the fluid flows to the relevant regions of the storage structure 1. In such examples, it may be particularly preferable to have smaller chill plants along the closed loop(s) which lower the temperature of the fluid as it flows around the closed loop(s) but, depending on the temperature-control objectives, that might not be necessary.

Figure 13:
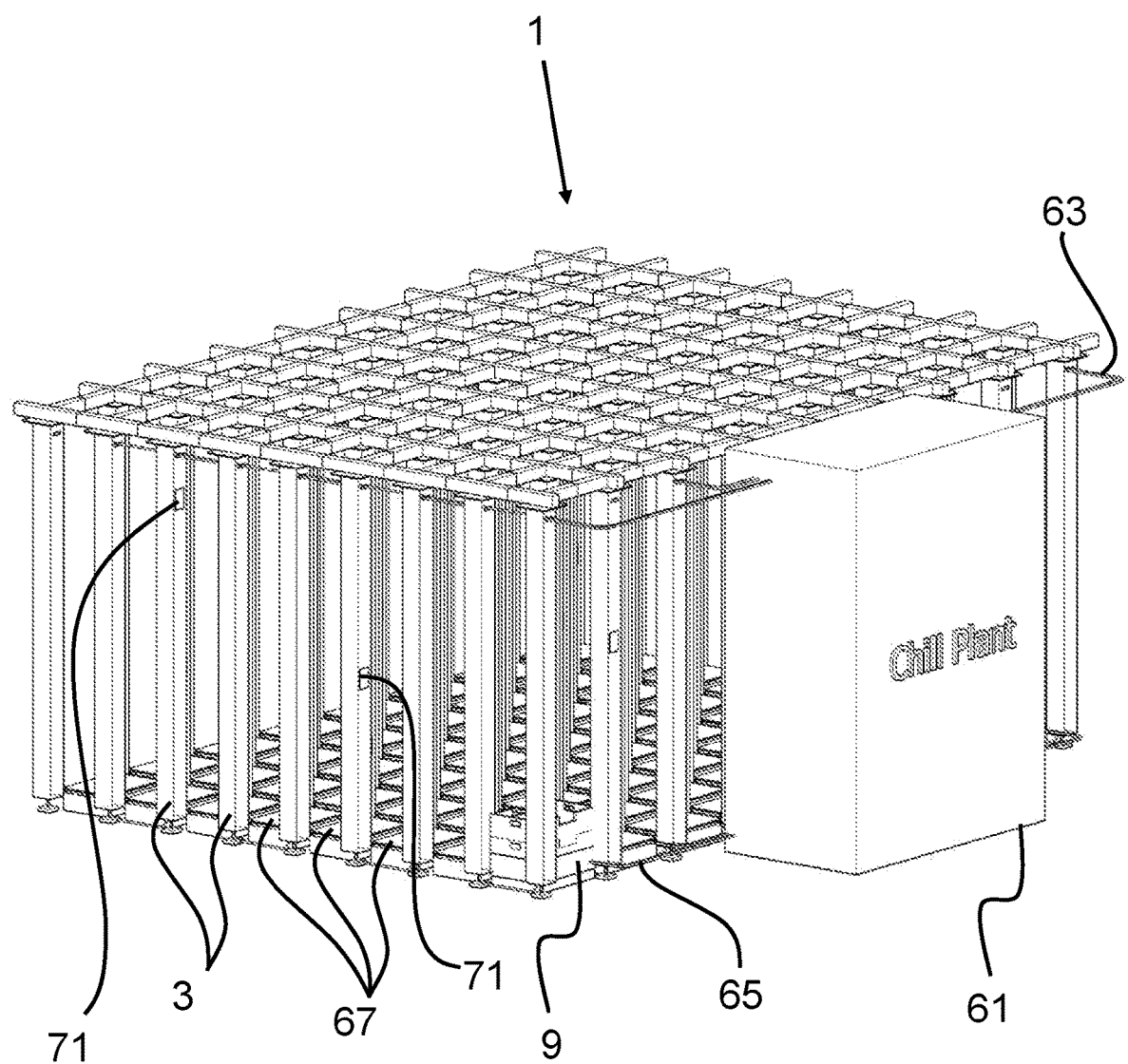
FIG. 13 schematically illustrates in perspective view a storage structure and temperature-control means.

A further example of a storage structure 1 with temperature-control means is illustrated in FIG. 13. Like the examples in FIG. 10 to FIG. 12, the example in FIG. 13 includes a chill plant 61 which supplies outbound tubing 63 with chilled fluid. The outbound tubing 63 directs the chilled fluid to target regions of the storage structure 1, as described above in the context of other examples. The fluid is returned from the regions of the storage structure 1 to the chill plant 61 by return tubing 65.

Figure 14:
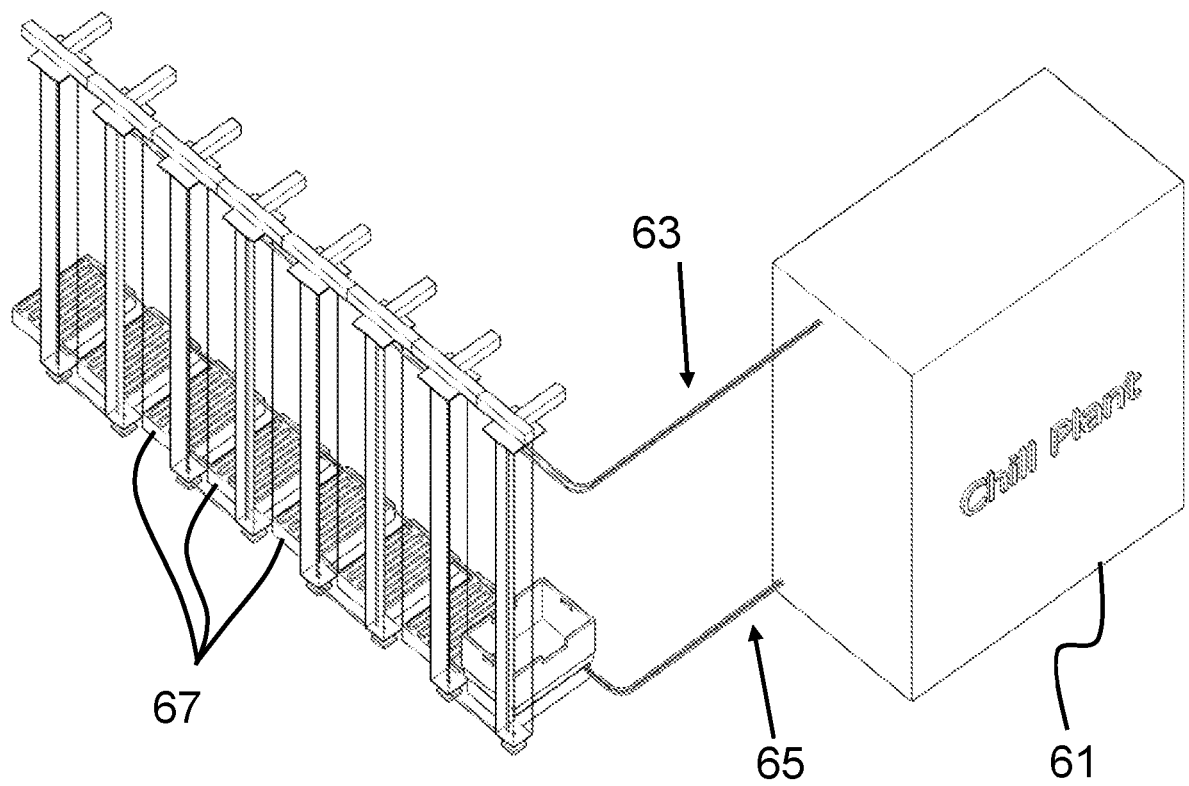
FIG. 14 schematically illustrates in perspective view parts of the storage structure and temperature-control means of FIG. 13.

In the example of FIG. 13, as well as passing down the upright members 3, branches of the outbound tubing 63 include meandering sections inside covered supports 67 on which stacks 11 of containers 9 rest in the storage structure 1. FIG. 14 schematically illustrates part of the example of FIG. 13, with only one row of the storage structure 1 shown and with the covers removed from the covered supports 67 to reveal the meandering sections of outbound tubing 63 underneath. Advantageously, the supports 67 with meandering sections of tubing concentrate cooling capacity at the bottoms of the grid cells (where containers 9 will always be if there are stacks 11 located in those particular grid cells).

In the examples illustrated in FIG. 10 to FIG. 14 the outbound tubing 63 emerges at the top of the chill plant 61 and enters the top of the storage structure 1 before descending, inside the upright members 3, to the supports 67. However, in other examples, the outbound tubing 63 may leave the chill plant 61 and/or enter the storage structure 1 at other points. Analogously, the return tubing 65 may exit the storage structure 1 at any suitable point and may enter the chill plant 61 at any suitable point. The respective points of entry and exit from the chill plant 61 and the storage structure 1 may be chosen to achieve particular temperature-control objectives.

Although in the illustrated example there are multiple supports 67 (one per grid cell in the illustrated examples), in other embodiments there may be more or fewer supports. Where there are fewer supports, each support may span one or more grid cells. For example, in some cases it may be preferable for there to be one support extending along one row of the storage structure 1, one support extending along and across two rows of the storage structure 1, or another permutation (e.g. one support covering an area of 2 grid cells by 2 grid cells for a total of four grid cells). In some examples, there may be only one support spanning the entire storage structure 1. The meandering sections of tubing 63 in each support may extend over substantially the whole area of the upper parts of the supports so that the cooling effect is spread over the whole area of the supports. Each support may have its own closed loop of tubing 63, 65 or may share a loop (e.g. via branches) with one or more other supports. In some examples, additional temperature-control components may be provided in the support(s). For example, one or more heating components may be provided inside the support(s) beneath the tubing 63. This may help to counteract any negative effects which might arise from cooling the floor area of the storage structure 1. There may furthermore be layers of insulation to isolate the heating components from the tubing 63, to minimise the impact of the two on each other. In some examples, the support(s) may be (or form part of) a floor which comprises multiple layers, including, at or near the top, the tubing 63, then (moving downwards) one or more layers of insulation, followed by the heating components, which may be embedded in a structural component such as a layer of concrete which supports the weight of the storage structure 1, any bots 31 mounted thereon, any containers 9 stored therein, and/or other objects in the vicinity. In some examples, one or more chill plants may be provided in the support(s). This may advantageously shorten the distance between a chill plant and a meandering sections of tubing 63 located at the bottoms of the stacks 11 of containers 9 in the support(s), thereby improving the temperature-control capacity of the system.

Like the ducting 53, 55, the tubing 63, 65 may be provided with insulation or other surrounding material to help control radiation from and/or conductivity through the tubing 63, 65. In some configurations, the outbound tubing 63 in particular may benefit from being well insulated so that as much of the benefit of the cooled fluid is delivered to the target region(s) as possible, i.e. the cooling benefit is not lost to other regions surrounding the tubing 63 before it has reached the target region(s). For example, the outbound tubing 63 may be insulated along some or all of the lengths between the chill plant and the helical sections (and/or between helical sections) to minimise cooling radiation from the outbound tubing 63 in non-target regions. The return tubing 65 may also be insulated along at least some of its length to minimise heating of the outbound tubing 63 by the nearby return tubing 65.

Like the ducting 53, 55, the tubing 63, 65 may be provided with one or more pumps or other flow aids to assist with fluid flow in the desired directions. For example, there may be a pump located in and/or at the entrance or exit of one or more branches of the outbound tubing 63 to direct fluid into the corresponding branch and into the desired region of the storage structure 1. The flow aids may be speed-controllable, i.e. to increase or decrease the level of flow provided by the flow aids.

Like the ducting 53, 55, the tubing 63, 65 may have different diameters along the length of the tubing 63, 65 (i.e. between the chill plant 61 and the inlet/outlet at the storage structure 1, respectively). This may advantageously help to control the flow along the tubing 63, 65. For example, where the tubing 63, 65 diverges into or converges from multiple branches, the diameter of the tubing 63, 65 may change to help maintain the relevant pressure and flow rates along the tubing 63, 65 towards other branches or the chill plant 61.

One or more valves may be provided in the tubing 63, 65 to help control fluid flow along the tubing 63, 65. For example, in some circumstances, it may be desirable to stop flow along a particular branch of the outbound tubing 63, e.g. if a different branch needs more chilled fluid to achieve a specific temperature for a period of time. The valve may be closed for the duration of that period of time and reopened when desired. The extent to which a given valve is open may be controllable, to give finer-grained flow control and pressure control and/or to allow some cooling capacity to be diverted from a first branch to a second branch but without completely removing the cooling capacity from the first branch. Multiple branches may direct cooling fluid to the same region or to different regions.

Like the chill plant 51, the chill plant 61 may include single or multiple outlets to which multiple different sections of tubing may be connected. This may be particularly useful in examples where the chill plant chills fluid to more than one temperature. For example, a single chill plant may be provided with the necessary hardware (e.g. pumps, refrigerant, chambers, etc) to produce fluid at a suitable temperature for chilling a region of the storage structure 1 to a "freezer" temperature (e.g. an at-or-below-freezing point temperature, such as in the range −30° C. to 0° C.) and fluid at a suitable temperature for chilling a region of the storage structure 1 to a "fridge" temperature (e.g. an at-or-above-freezing point temperature, such as in the range 0° C. to 10° C.). As described above, in some examples, multiple chill plants 61 may be provided in and/or around one storage structure 1 to reach specific temperature-control objectives.

Although in the illustrated examples chill plants 51, 61 are shown as monolithic blocks, the chill plants may in fact comprise separate, interconnected portions which are located in different places. For instance, a chill plant may comprise an air-handling unit which is located inside the building or other space where the corresponding storage structure 1 is located and which accommodates one or more components of the chill plant (e.g. a fluid pump), and a chilling unit located outside the building, the chilling unit being connected to the air-handling unit (e.g. by ducting) to allow a flow of air or another fluid between the air-handling unit and the chilling unit. Other types of plant (e.g. dehumidifying plants) may similarly comprise monolithic blocks or separate, interconnected portions. Several types of plant may be connected to one another.

In some examples, temperature, humidity and/or other sensors may be provided within the storage structure 1 to monitor atmospheric conditions in the storage structure 1. Data from the sensors may be used to determine whether more or less cooling or other atmospheric control or input is required, and to correspondingly influence the functioning of one or more components of the storage system, such as the chill plant 51, 61 and any flow aids. For example, in FIG. 13, temperature sensors 71 are mounted on upright members 3 of the storage structure 1 and measure the temperature in their vicinities. The data from the temperature sensors 71 may be used to determine how best to supply cooling fluid to a target region of the storage structure 1 to achieve a desired temperature or other environmental condition in that region. For example, the data may be used to determine how much cooling fluid to supply to the region of the storage structure 1, and/or to determine a rate of supply of cooling fluid to the region, and/or to determine a target temperature of the cooling fluid to be supplied to the region. Temperature, humidity and/or other sensors may additionally or alternatively be provided on or in the containers 9, e.g. mounted inside the containers 9, to allow more location-specific temperature measuring to be conducted. Such sensors may be expected to move with their corresponding containers 9, which may advantageously enable the temperature of the goods stored inside the corresponding containers 9 to be tracked as the goods are moved, e.g. as the goods move along a supply chain from a source to a distributer and then to an end user.

A controller may be provided to control one or more controllable aspects of the storage system, such as the chill plant(s) (e.g. the temperature of the output chilled fluid), the speed of any flow means provided in the system (e.g. in the ducting 53, 55, the tubing 63, 65 or the chill plant(s)), the extent of opening of any valves in the system (e.g. in the ducting 53, 55, the tubing 63, 65 or the chill plant(s)), and/or any other controllable aspects of the system. Controlling these controllable aspects of the system may enable the system to maintain different regions of the multitemperature storage system at the desired temperatures, despite external variations such as changes in an ambient temperature, or changes in fluid flow in specific locations due to movement of one or more bots 31 across the top of the storage structure 1. The controller may act in dependence on inputs from one or more of the sensors described above, such as a temperature sensor which may measure the temperature in a specific region of the storage structure 1 or the temperature of a fluid output from an air-handling unit of a chill plant.

The controller may for example include one or more processors or other data-processing components ("processing means") which are configured to generate and send instructions to control other components to which the data-processing components are connected directly or indirectly. For example, the other components may be connected to the data-processing components wirelessly via one or more wireless transceivers. The data-processing components may further be configured to receive data in the form of temperature, humidity or other readings from one or more sensors and to process that data in order to determine the instructions to be sent to the other components. The controller may include one or more storage means (e.g. RAM or other memory) in which the data can be stored for processing. The controller may be configured to act substantially autonomously, without input from a human. The controller may however include a manual override feature to allow a human to control one or more components via the controller.

Although in the above paragraphs the provision of cooling from a chill plant has been described, heating may alternatively or additionally be supplied from a heating plant to one or more regions of a storage structure 1, depending on the relative temperatures to be maintained between the regions of the storage structure 1 and any ambient temperature(s). In such cases, the above references to "cooling fluid" (e.g. air in the context of the examples of FIG. 6 to FIG. 9 or ethylene glycol or liquid nitrogen in the context of the examples of FIG. 10 to FIG. 14) or similar may be replaced by "heating fluid", as appropriate. Cooling and heating fluids may both be referred to as temperature-control fluids. Similarly, cooling plants and heating plants may both be referred to as temperature-control plants. Temperature-control plants may be one example of an environment-control plant. Other environment-control plants may include humidity-control plants.

In some examples, one multitemperature storage system may use both "open" temperature-control means, such as the air-and-ducting examples shown in FIG. 6 to FIG. 9, and "closed" temperature-control means, such as the fluid-and-tubing examples shown in FIG. 10 to FIG. 14. For instance, a first region of a storage structure 1 may be served by air-and-ducting temperature-control means and a second region of the storage structure 1 may be served by fluid-and-tubing temperature-control means. The system may for example be arranged such that a first, large region is maintained at a first temperature by "open" temperature-control means and a second, smaller area (e.g. within the larger first region) is maintained at a second, lower temperature by "closed" temperature-control means as well as or instead of the "open" temperature-control means. In general, "closed" temperature-control means may be more precisely directed than "open" temperature-control means. In other arrangements, the second temperature may be higher than the first temperature.

As shown in FIGS. 11 and 12, different temperature regions within a storage structure 1 may be defined and/or preserved by solid partitions 75 (e.g. stationary walls or moveable baffles, controllable by the above-described controller or otherwise, separating different areas of the storage structure 1) and/or by fluid partitions 74 (e.g. walls or curtains of air or another fluid or fluids which are caused to flow, e.g. at high velocity and/or pressure, in a given direction to prevent air of one temperature from passing between regions of different temperatures), i.e. to minimise exchange of thermal energy between regions of different temperatures. For example, a substantially vertical wall of high-velocity air 74 may prevent air from travelling horizontally into a neighbouring region of the storage structure 1. Equivalently, a substantially horizontal wall of high-velocity air may prevent air from travelling vertically into a neighbouring region of the storage structure 1. Other orientations of separating air curtain or other partition are also possible, allowing horizontally-, vertically-and/or otherwise-separated regions of different temperatures within the storage structure 1.

In some embodiments, partitions or other components may be made of or comprise temperature-control substances (e.g. phase-change material and/or insulating material) which can be controlled to be at specific temperatures to provide cooling in the vicinity of the partitions or other components.

In some embodiments, partitions may be constructed using containers 9 arranged adjacent to one another vertically and/or horizontally. In such cases, the containers 9 may contain temperature-control substances (e.g. phase-change material and/or insulating material) to further assist with temperature control of the region partitioned by the containers 9.

The locations of the partitions defining the different-temperature regions, and the volumes of the regions defined by the partitions, may be chosen to accommodate and optimise fluid flow due to changes in air pressure as containers 9 move around the storage structure 1. For example, as containers 9 are moved around the storage structure 1 by the bots 31, air may be displaced from one part of the storage structure 1 to another, creating an area of relatively low pressure where the container 9 previously was. Placement of the partitions to accommodate not only the target temperature region but also a buffer around one or more sides of the region may advantageously mean that the area of relatively low pressure can be filled by already chilled air within the space bounded by the partitions rather than being filled by warmer air from a region outside the partitioned region. The partitions may for example enclose an additional volume of space at the sides of the storage structure 1 from which already cooled air is drawn to fill the low-pressure area left behind by the movement of the container 9.

Alternatively or additionally, one or more separate dedicated chambers of cooled air may be provided with appropriate ducting to direct air to the storage structure 1 when areas of low pressure appear. The one or more dedicated chambers may therefore provide a reservoir of cooled air which can fill gaps left by movement of containers 9 within the storage structure 9. This may increase the efficiency of the multitemperature storage system by minimising the mixing of cooled air with warmer air from the surroundings. One or more flow aids may be provided to promote flow of cooled fluid between the reservoir formed by the dedicated chamber(s) and the target regions of the storage structure 1.

In some examples, one or more substantially vertically orientated partitions may be provided between neighbouring grid cells in the top layer or top layers of the storage structure 1. This may advantageously reduce the horizontal flow of air at or towards the top of the storage structure 1, which may help to define a thermocline layer at or towards the top of the storage structure 1. This may advantageously minimise the mixing of air from above the storage structure 1 (which may be warmer due to presence and movement of the bots 31) and air from within the storage structure 1. When viewed from above, the one or more substantially vertically orientated partitions may appear to define a honeycomb pattern in or near the top layer(s) of the storage structure 1.

In some examples, outbound ducting 53 or tubing 63 may direct temperature-control fluid directly onto one or more containers within the storage structure 1 to achieve particular temperature control objectives with respect to the contents of the container(s). In particular, ducting 53 or tubing 63 may direct temperature-control fluid directly into, or adjacent to or onto the base(s) or side(s) of, the container(s). This may advantageously minimise turbulence or mixing of fluids of different temperatures before the fluid at the target temperature reaches the container, thereby maximising efficiency of the multitemperature storage system.

In some examples, the rate of fluid flow may be optimised to balance energy efficiency and cooling effectiveness, i.e. to maintain the given region(s) of the multitemperature storage system at the respective target temperature(s) in the most energy-efficient way. For example, in some examples, it may be possible to achieve the desired target temperature(s) with a comparatively low cooling effort at the chill plant if the speed of fluid flow through the multitemperature storage system is increased, and this may be more energy efficient than a higher cooling effort at the chill plant with a lower speed of fluid flow through the multitemperature storage system. As described above, the controller may, with one or more sensors, monitor these parameters and calculate an optimal set of instructions for achieving the target temperature(s). This may be a continual process, e.g. to accommodate the movement of the containers within the storage structure 1 and the corresponding variations in fluid flow within the storage structure 1. Flow aids may be provided at any location (e.g. on, in or near the storage structure 1) to help achieve the desired temperature-control objectives and/or other objectives. For example, in some embodiments, one or more fans may be provided to promote horizontal fluid flow (e.g. from one side of the storage structure 1 towards the other) or vertical fluid flow (e.g. downwards or upwards through the storage structure 1), separately from any flow aids provided in connection with any chill plant(s), ducting or tubing.

Although the embodiments described in the context of FIG. 6 to FIG. 9 were described in terms of providing chilled "air", other fluids may be used instead. For example, depending on the goods to be stored in the storage structure 1 and whether humans or other living creatures are expected to occupy the space surrounding the storage system, a fluid with a different composition from air may be used, such as a fluid with greater thermal conductivity. In some examples, a fluid mixture containing more carbon dioxide than air typically does may be used.

Furthermore, a single multitemperature storage system (as described in the context of FIG. 6 to FIG. 9 and/or as described in the context of FIG. 10 to FIG. 14) may use a plurality of different types of fluids, such as air, refrigerant, glycol, water and/or others, at different locations to achieve the local temperature-control objectives and/or to provide redundancy to minimise the impact of a failure of one or more chill plants or other components of the multitemperature storage system. For example, a first fluid may be used in a first region of the multitemperature storage system, a second fluid may be used in a second region of the multitemperature storage system, etc, according to temperature-control objectives and/or the determinations by the controller of how to provide desired temperature control.

Although the primary objective of the multitemperature storage system is to provide temperature-control within the context of a storage structure, it may additionally be possible or necessary to effect localised control of other environmental parameters, such as a humidity, wind chill, radiation levels, etc. using the components of the multitemperature storage system (possibly in combination with additional components such as dehumidifiers or radiation-inhibiting materials or components). Such additional components may be incorporated into other systems or components—for instance, a dehumidifier may be incorporated into a chill plant—or may be provided as separate systems. The additional components may be controlled independently of the other systems or components, or in conjunction with them, e.g. by a common controller which controls both components or sets of components. Maintaining, for example, a target ambient relative humidity within the storage structure may help to maximise the efficiency of the multitemperature storage system. It may furthermore allow the physical location of a dew point within the storage structure 1 to be controlled. Active or passive drainage for condensation may be provided within the storage structure 1 in the vicinity of the dew point to help ensure a target ambient relative humidity can be achieved. For example, desiccant may be provided in the vicinity of the dew point or at other locations within the storage structure 1 to absorb condensation. One or more humidity sensors may be provided in the vicinity of the desiccant or other drainage to determine when to activate active drainage or when desiccant needs to be replaced, to further maximise efficiency of the multitemperature control system. The storage structure 1 may accordingly be provided with one or more desiccant-storage locations where desiccant can be placed and stored to provide local moisture absorption.

One or more thermostats may be provided as part of the multitemperature storage system to help achieve the desired temperatures in the respective regions. For example, one or more of the previously mentioned valves may be controlled in dependence on the one or more thermostats.

In some examples, one or more of the bots 31 may be provided with temperature-control means (such as phase-change material and/or one or more flow aids) to provide localised cooling in the immediate vicinity of the bots 31. For example, a bot 31 may propel cool air downwards into the storage structure 1. A bot 31 may be sent to a specific grid cell to perform such an operation. A bot 31 may propel cool air downwards into the storage structure 1 while the bot 31 is stationary or while it is in motion on the storage structure 1.

In some examples, one or more packs of phase-change material may be mounted at specific locations (e.g. on the sides or top of the storage structure 1) to provide localised cooling. The packs of phase-change material may be coupled with one or more flow aids to help propel cool air from the vicinity of the packs of phase-change material into the storage structure 1 at target locations.

It is envisaged that any one or more of the variations described in the foregoing paragraphs may be implemented in the same example of a multitemperature storage system.

The above-described features provide a multitemperature storage system with different regions which can be maintained at different temperatures and/or other environmental conditions depending on, for instance, the goods to be stored in the regions. More particularly, the system advantageously allows a single storage structure 1 to be used to store goods at different temperatures, by providing localised temperature control. The localised temperature control may be implemented in different ways in different parts of the grid. The system may enable an efficient use of a single site on which one large storage structure 1 can be constructed (taking advantage of the efficiencies that come with building fewer larger structures rather than more smaller structures), the large storage structure accommodating different temperature requirements. Although one example usage may involve a multitemperature storage system with a "fridge" region and a "freezer" region, other examples may include more regions. For example, different goods may advantageously be stored at temperatures such as 20° C., 15° C., 10° C., 5° C., 0° C., −5° C., −10° C., −15° C., 20° C., −25° C., etc. depending on their specific properties. This may enable the same storage structure 1 to optimally store individual goods based on their particular requirements, which may advantageously increase the period of time for which the products can be stored. This may be especially useful for foodstuffs, medicines, plants and other temperature-sensitive items.

In this document, the language "maintain a region at a temperature" and similar/derivative wording is intended to mean to keep the region in question within a tolerable margin of the specified temperature. For example, it may involve keeping the region within a range of temperatures around the specified single temperature, such as a range of ±a° C., ±b% (where a and b are numerical values to be specified) or another acceptable measure of deviation.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" and its derivatives are intended to include the possibilities of direct and indirect contact. For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the possibility that x is directly mounted on y, with no intervening components, and the possibility that x is indirectly mounted on y, with one or more intervening components.

In this document, the word "comprise" and its derivatives are intended to have an inclusive rather than an exclusive meaning. For example, "x comprises y" is intended to include the possibilities that x includes one and only one y, multiple y s, or one or more y's and one or more other elements. Where an exclusive meaning is intended, the language "x is composed of y" will be used, meaning that x includes only y and nothing else.

The invention claimed is:

1. A multitemperature storage system, comprising:
a storage structure including a plurality of upright members, a plurality of horizontal members supported by the upright members and forming a grid pattern defining a plurality of grid cells and allowing containers to be arranged in stacks beneath the grid cells defined by the grid pattern, and a track structure on top of the horizontal members, the track structure being configured to allow a load-handling device to move across the storage structure to retrieve a container from a stack; and
temperature-control means configured to maintain a first-temperature region within the storage structure at a first temperature and a second-temperature region within the storage structure at a second temperature, the temperature-control means including a temperature-control plant and tubing providing a closed loop along which temperature-control fluid is configured to flow from the temperature-control plant to the first-temperature region within the storage structure and from the first-temperature region within the storage structure to the temperature-control plant; and
an air curtain configured to reduce exchange of thermal energy between the first-temperature region and the second temperature region.

2. The multitemperature storage system as claimed in claim 1, wherein the tubing comprising:
outbound tubing configured to carry temperature-control fluid to the first-temperature region.

3. The multitemperature storage system as claimed in claim 2, wherein the tubing comprises:
return tubing configured to carry temperature-control fluid away from the first-temperature region.

4. The multitemperature storage system as claimed in claim 1, comprising:
an additional temperature-control plant, the additional temperature-control plant being configured to supply temperature-control fluid to at least one of the first-temperature region and the second-temperature region via a fluid carrier.

5. The multitemperature storage system as claimed in claim 1, comprising:
a flow aid configured to assist flow of the temperature-control fluid to the first-temperature region of the storage structure.

6. The multitemperature storage system as claimed in claim 5, comprising:
a solid partition configured to reduce exchange of thermal energy between the first-temperature region and the second-temperature region.

7. The multitemperature storage system as claimed in claim 5, comprising:
a sensor configured to monitor an atmospheric condition within the first-temperature region.

8. A controller for the multitemperature storage system as claimed in claim 7, comprising:
processing means which are configured to generate and send instructions to control the temperature-control means to maintain the first-temperature region at the first temperature and the second-temperature region at the second temperature.

9. The controller as claimed in claim 8, wherein the controller is configured to receive data from the sensor and to generate the instructions in dependence on the received data.

10. The controller for a multitemperature storage system as claimed in claim 9, comprising:
processing means which are configured to generate and send instructions to control the temperature-control means to maintain the first-temperature region at the first temperature and the second-temperature region at the second temperature.

11. The controller as claimed in claim 10, wherein the controller is configured to generate and send instructions to the flow aid.

12. The multitemperature storage system as claimed in claim 1, wherein the closed loop provided by the tubing comprises:
multiple branches.

13. The multitemperature storage system as claimed in claim 1, wherein the tubing comprises:
a flow-control valve configured to control flow of temperature-control fluid along the tubing.

14. The controller for a multitemperature storage system as claimed in claim 13, comprising:
processing means which are configured to generate and send instructions to control the temperature-control means to maintain the first-temperature region at the first temperature and the second-temperature region at the second temperature.

15. The controller as claimed in claim 14, wherein the controller is configured to generate and send instructions to the flow-control valve.

16. The multitemperature storage system as claimed in claim 1, wherein the tubing comprises:
a shaped section configured to concentrate temperature-control fluid in the first-temperature region.

17. A method of controlling the temperature of a multitemperature storage system which includes a plurality of upright members, a plurality of horizontal members supported by the upright members and forming a grid pattern defining a plurality of grid cells and allowing containers to be arranged in stacks beneath the grid cells defined by the grid pattern, and a track structure on top of the horizontal members, the track structure being configured to allow a load-handling device to move across the storage structure to retrieve a container from a stack;
temperature-control means configured to maintain a first-temperature region within the storage structure at a first temperature and a second-temperature region within the storage structure at a second temperature, the temperature-control means including a temperature-control plant and tubing providing a closed loop along which temperature-control fluid is configured to flow from the temperature-control plant to the first-temperature region within the storage structure and from the first-temperature region within the storage structure to the temperature-control plant; and
an air curtain configured to reduce exchange of thermal energy between the first-temperature region and the second-temperature region,
the method comprising:
providing temperature-control fluid to the first-temperature region to maintain the first-temperature region at the first temperature; and
retrieving temperature-control fluid from the first-temperature region.

18. The method of controlling the temperature of the multitemperature storage system as claimed in claim 17, comprising:
determining, based on data received from one or more sensors, how to optimally provide temperature-control fluid to the first-temperature region.

19. A computer-readable storage medium encoded with instructions which, when executed by a processor, cause performance of the method of claim 17.

* * * * *